United States Patent [19]
Zalewski et al.

[11] Patent Number: 5,695,022
[45] Date of Patent: Dec. 9, 1997

[54] DOUBLE OFFSET TRANSFER CASE WITH ELECTRONICALLY-CONTROLLED TORQUE MODULATION

[75] Inventors: John D. Zalewski, Liverpool; James S. Brissenden, Baldwinsville, both of N.Y.

[73] Assignee: New Venture Gear, Inc., Troy, Mich.

[21] Appl. No.: 562,870

[22] Filed: Nov. 27, 1995

[51] Int. Cl.⁶ .................................................. B60K 17/34
[52] U.S. Cl. ................... 180/249; 180/197; 475/202; 475/222; 364/424.098
[58] Field of Search ............................ 180/233, 247, 180/248, 249, 250, 197; 475/202, 204, 206, 222, 223, 295; 364/424.098

[56] References Cited

U.S. PATENT DOCUMENTS

| | | | |
|---|---|---|---|
| 4,632,207 | 12/1986 | Moore | 180/247 |
| 4,677,873 | 7/1987 | Eastman et al. | 475/202 |
| 4,688,447 | 8/1987 | Dick | 74/665 T |
| 4,938,738 | 7/1990 | Fuelberth et al. | 475/317 |
| 5,046,998 | 9/1991 | Frost | 475/221 |
| 5,078,660 | 1/1992 | Williams et al. | 475/84 |
| 5,106,351 | 4/1992 | Williams et al. | 475/250 |
| 5,116,293 | 5/1992 | Reuter | 475/202 |
| 5,159,847 | 11/1992 | Williams et al. | 74/337.5 |
| 5,358,454 | 10/1994 | Bowen et al. | 475/94 |
| 5,363,938 | 11/1994 | Wilson et al. | 180/249 X |
| 5,609,540 | 3/1997 | Brissenden et al. | 180/250 X |

*Primary Examiner*—Kevin Hurley
*Attorney, Agent, or Firm*—Harness, Dickey & Pierce, P.L.C.

[57] ABSTRACT

A power transfer system for a four-wheel drive vehicle is disclosed having a transfer case with its input angled relative to its outputs by means of a constant velocity (CV) universal joint. More specifically, the transfer case input includes a first rotary member adapted to be rotatably driven about the rotary axis of the transmission output shaft, a second rotary member supported for rotation about a second rotary axis that is angled relative to the first rotary axis, and a CV joint interconnecting the first and second rotary members. The transfer case outputs include a pair of rotary output members supported for relative rotation about a common third rotary axis that is offset from the second rotary axis. A torque transfer arrangement is provided for transferring torque from the transfer case input to its outputs. As such, the CV joint allows the transfer case to be angulated so that reduced departure angles are achieved with respect to the prop shaft connections. The transfer case includes a two-speed reduction apparatus, an electronically-controlled transfer clutch, and a mode shift arrangement for permitting the vehicle operator to select operation in various on-demand and part-time four-wheel drive modes.

25 Claims, 13 Drawing Sheets

DOUBLE OFFSET TRANSFER CASE WITH ELECTRONICALLY-CONTROLLED TORQUE MODULATION

BACKGROUND OF THE INVENTION

The present invention relates to a power transfer system for a four-wheel drive motor vehicle and, in particular, to a transfer case having means for establishing an angular driving connection between the transfer case input and the output of a multi-speed transmission.

In view of the increased popularity of four-wheel drive vehicles, a plethora of power transfer systems are currently utilized for distributing tractive power (i.e., drive torque) to all four wheels of the motor vehicle. Conventionally, most four-wheel drive power transfer systems include a transfer case having an input shaft driven by the transmission output shaft, a rear output shaft driven by the input shaft and which is interconnected via a rear prop shaft to a rear axle assembly for driving the rear wheels, a front output shaft interconnected via a front prop shaft to a front axle assembly for driving the front wheels, and a torque transfer arrangement for continuously or selectively transferring drive torque from the rear output shaft to the front output shaft.

In "part-time" four-wheel drive systems, the transfer case is equipped with a shift mechanism which permits the vehicle operator to selectively couple and de-couple the front and rear output shafts for shifting the vehicle between a two-wheel drive mode and a four-wheel drive mode. An example of a part-time transfer case is shown and disclosed in commonly-owned U.S. Pat. No. 5,159,847 to Williams et al. In "full-time" four-wheel drive systems, the transfer case is equipped with an interaxle differential for continuously dividing drive torque between the front and rear output shafts while permitting speed differentiation therebetween. In order to prevent traction loss due to excessive wheel slip, most full-time transfer cases are also equipped with a "slip limiting" device for selectively or automatically locking the interaxle differential to limit or prevent speed differentiation in response to the wheel slip. Commonly-owned U.S. Pat. No. 5,106,351 to Williams et al. discloses an exemplary full-time transfer case equipped with a viscous coupling for limiting slip across the interaxle differential.

Alternatively, "on-demand" power transfer systems are used for automatically directing power to the non-driven wheels, without any input or action on the part of the vehicle operator, when traction is lost at the driven wheels. Typically, a speed-sensitive torque transfer device is installed between the front and rear output shafts for progressively delivering torque to the front output shaft in response to increasing speed differential therebetween. Such torque transfer devices commonly include viscous couplings, geared coupling and the like. An exemplary geared torque transfer device is disclosed in commonly-owned U.S. Pat. No. 5,358,454 to Bowen et al. More recently, however, the torque transfer device used in on-demand four-wheel drive systems has been a modulatable clutch, the output of which is controlled electronically in response to various detected vehicle operating parameters. An example of an electronically-controlled on-demand power transfer system is disclosed in commonly-owned U.S. Pat. No. 5,363,938 to Wilson et al.

Transfer cases are commonly classified as being either of a single offset type or a double offset type. In single offset transfer cases, only one of the output shafts is offset from the rotational axis of the input shaft. In particular, several of the above-noted commonly owned patents illustrate a conventional arrangement wherein the rotary axis of the rear output shaft is commonly aligned with that of the input shaft while the rotary axis of the front output shaft is parallel to, yet offset from, the rotary axis of the input shaft. However, a problem commonly associated with this type of transfer case is that the rear prop shaft, due to its central alignment, takes up a substantial amount of the vehicle's underbody space which inhibits placement of an underbody spare tire and/or necessitates usage of a saddle-type gas tank. In double offset transfer cases, the front and rear output shafts are commonly aligned and are both offset from the rotary axis of the input shaft. Accordingly, such double offset transfer cases provide increased underbody space for purposes of locating a spare tire and/or installing a larger fuel tank.

A major design consideration in the development of four-wheel drive systems is to minimize the departure angles at the connections between the transfer case front and rear output shafts and their corresponding prop shafts. The departure angle is defined as the included angle between the rotary axis of the prop shaft and that of the transfer case output shaft. Traditionally, single cardon universal joints are used at each end of the prop shafts if the departure angle is less than about five degrees. If the departure angles exceed this threshold limit, then more expensive double cardon universal joints are required at the prop shaft/transfer case connection. As an alternative, U.S. Pat. Nos. 4,632,207 to Moore and 5,116,293 to Reuter disclose the use of a constant velocity (CV) joint at the front output of a single offset type of transfer case. An alternative arrangement is likewise shown in U.S. Pat. No. 4,688,447 to Dick. While such arrangements attempt to solve the problems associated with large departure angles at the front output, they do not address this concern at the rear output nor are the teachings applicable to double offset transfer cases.

SUMMARY OF THE INVENTION

Accordingly, the present invention is directed to overcoming the disadvantages associated with conventional four-wheel drive systems by providing a power transfer system having a transfer case with its input angled relative to its outputs by means of a constant velocity (CV) universal joint. More specifically, the transfer case input includes a first rotary member adapted to be driven about the rotary axis of the transmission output shaft, a second rotary member supported for rotation about a second rotary axis that is angled relative to the first rotary axis, and a CV joint interconnecting the first and second rotary members. The transfer case outputs include a pair of rotary output members supported for relative rotation about a third rotary axis that is offset from the second rotary axis. As such, the CV joint allows the transfer case to be angulated so that reduced departure angles are achieved with respect to the prop shaft connections.

A further feature of the present invention is to provide a CV joint in the input section of an electronically-controlled On-Demand transfer case. In one preferred form, the transfer case is equipped with a two-speed reduction apparatus having a range clutch, an electronically-controlled transfer clutch, a mode clutch, and a shift mechanism that are cooperatively associated for establishing at least an On-Demand high-range drive mode, a Part-Time Four-Wheel low-range drive mode, and a Neutral non-driven mode. The transfer case is also capable of providing a Two-Wheel high-range drive mode, a Part-Time four-wheel high-range drive mode, and an On-Demand low-range drive mode.

The power transfer system of the present invention includes a transfer case designed to normally deliver drive torque to the primary (i.e., driven) wheels and which is equipped with a transfer clutch operable for automatically transferring a portion of the drive torque to the secondary i.e., non-driven) wheels. The power transfer system further includes an array of sensors for detecting various dynamic and operational characteristics of the vehicle and generating sensor input signals indicative thereof, a mode select mechanism for permitting the vehicle operator to select one of the available operative modes and generating a mode signal indicative thereof, and a controller apparatus for controlling actuation of the transfer clutch in response to the sensor input signals and the mode signal. The mode select mechanism permits the vehicle operator to shift the transfer case into one of a Neutral mode, a Part-Time four-wheel drive mode, and an On-Demand drive mode. When the Neutral mode is selected, no drive torque is delivered to either of the primary or secondary wheels. When the Part-Time four-wheel drive mode is selected, the mode clutch directly couples the secondary wheels to the primary wheels for distributing drive torque as dictated by the tractive force generated at each respective set of wheels. When the "On-Demand" mode is selected, the mode clutch is released and the actuated condition of the transfer clutch is controllably modulated as a function of the sensor input signals for automatically varying the ratio of drive torque directed to the primary and secondary wheels. Thus, the power transfer system automatically provides improved traction and steering control upon the occurrence of instantaneous and unanticipated traction loss at the driven wheels when operating in the On-Demand drive mode.

A further object of the present invention is to supply one or more "operator-initiated" input signals to the control apparatus for further controlling On-Demand operation of the power transfer system. Preferably, each operator-initiated input signal is indicative of the position of a movable control element (i.e., accelerator pedal, throttle position, steering wheel, brake pedal, etc.) and are used, in conjunction with the sensor input signals, for optimizing the amount of drive torque delivered to the non-driven wheels during operation in the On-Demand drive mode.

BRIEF DESCRIPTION OF THE DRAWINGS

Further objects, features, and advantages of the present invention will become apparent from analysis of the following written specification, the accompanying drawings, and the appended claims in which:

DETAILED DESCRIPTION OF THE PREFERRED EMBODIMENTS

Figure 1:
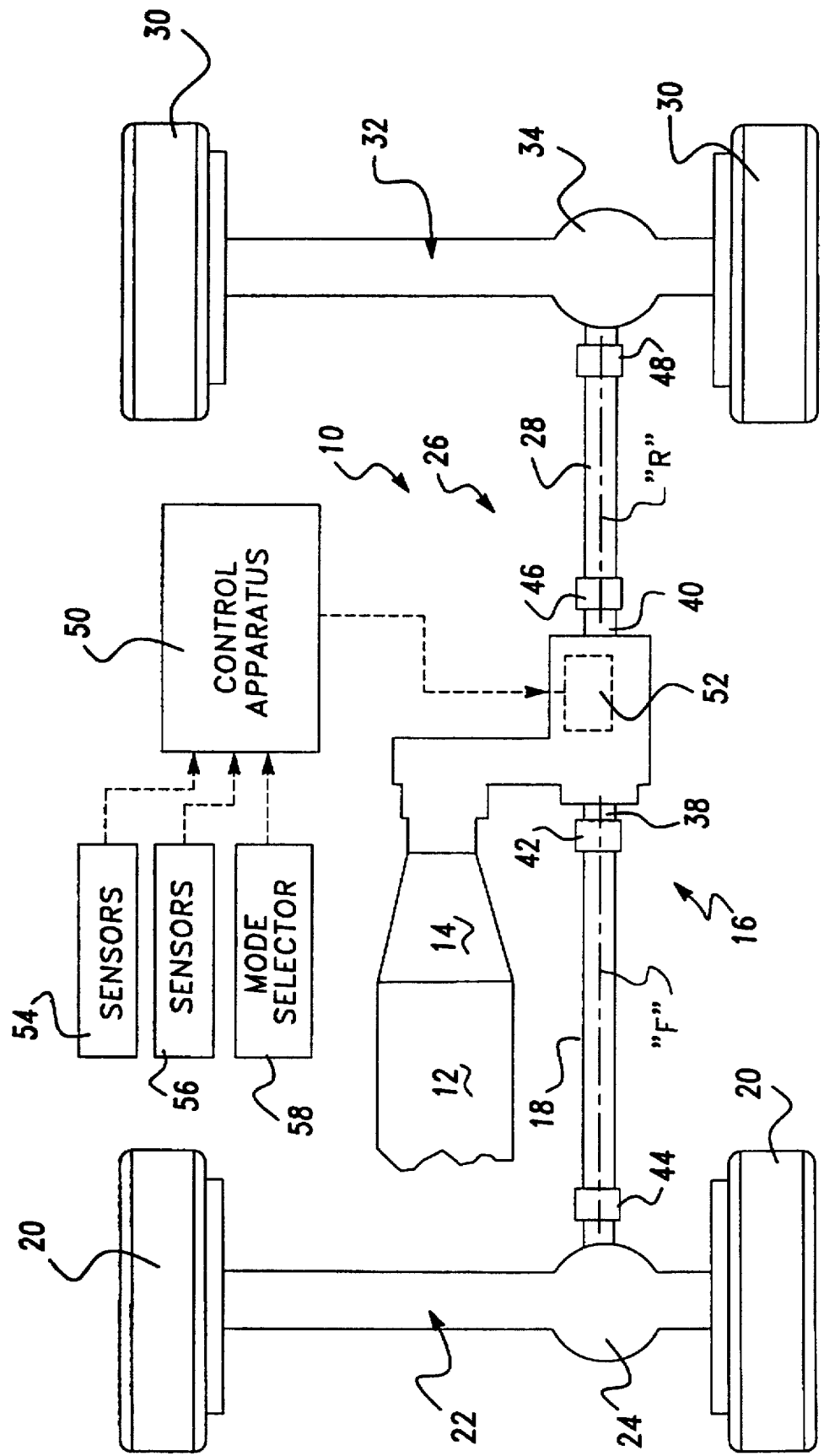
FIG. 1 is a top plan view of a power transfer system for a four-wheel drive motor vehicle utilizing the double offset transfer case of the present invention for connecting the drivetrain to the front and rear drivelines.

In general, the present invention is directed to a transfer case for use in four-wheel drive vehicles which is equipped with a constant velocity (CV) type universal joint for angling the transfer case input relative to its outputs so as to reduce the departure angles of the front and rear drivelines relative thereto. The reduced driveline angles facilitate the use of less expensive single cardon joints at the transfer case outputs in substitution for the traditional, more expensive, double cardon variety. Moreover, the present invention is directed to a power transfer system which is operably installed between the primary (i.e., driven) and secondary (i.e., non-driven) wheels of a four-wheel drive vehicle and which includes means for permitting a vehicle operator to select between a Part-Time four-wheel drive mode, an On-Demand drive mode, and a Neutral non-driven mode. When shifted into the On-Demand drive mode, the amount of power (i.e., drive torque) delivered to the non-driven wheels is controllably regulated in accordance with various system and driver-initiated inputs for optimizing the tractive characteristics of the vehicle while concomitantly enhancing overall steering control. Thus, the following written disclosure, when taken in conjunction with the drawings and claims, is intended to describe the best mode presently known to the inventors for making the inventive concepts claimed.

Referring to the drawings, a power transfer system 10 for a four-wheel drive vehicle is shown which incorporates the novel principles and features of the present invention. The vehicle includes a drivetrain defined schematically by an engine 12 and a transmission 14. The vehicle also includes a front (secondary) driveline 16 defined by a front prop shaft 18 that is interconnected to a pair of front wheels 20 via a front axle assembly 22 including a front differential 24. As seen, front prop shaft 18 is adapted to rotate about an axis, denoted by reference letter "F".

A rear (primary) driveline 26 is defined by a rear prop shaft 28 that is interconnected to a pair of rear wheels 30 via a rear axle assembly 32 including a rear differential 34. Likewise, rear prop shaft 28 is adapted to rotate about an axis, denoted by reference letter "R". Drivetrain 10 is coupled to front driveline 16 and rear driveline 26 via a power transfer apparatus, hereinafter referred to as transfer case 36. Transfer case 36 has an input 37 that is driven by the output of transmission 14, a front (secondary) output shaft 38, a rear (primary) output shaft 40, a torque transfer arrangement 41 for selectively transferring drive torque from input 37 to output shafts 38 and 40. Front output shaft 38 is connected to the rearward end of front prop shaft 18 via a conventional single cardon universal joint 42. Similarly, the forward end of front prop shaft 18 is connected to front differential 24 by means of a single cardon universal joint 44. Likewise, rear output shaft 40 is connected to a forward end of rear prop shaft 28 via a single cardon universal joint 46 while the rearward end of rear prop shaft 28 is connected to rear differential 34 by means of a single cardon universal joint 48. In the particular embodiment shown, power transfer system 10 is a rear wheel drive system arranged to normally drive rear wheels 30 (i.e., the primary or driven wheels) for establishing a two-wheel drive operating state. Torque transfer arrangement 41 is adapted to transfer drive torque to front wheels 20 (i.e., the secondary or non-driven wheels) in addition to rear wheels 30 for establishing a four-wheel drive operating state.

Power transfer system 10 includes a control apparatus 50 for controlling the transfer of drive torque to front output shaft 38 via a transfer clutch, schematically shown at reference numeral 52. A first set of sensors, indicated by block 54, are provided for sensing specific dynamic and operational characteristics of the motor vehicle and generating sensor input signals indicative thereof. A second set of sensors, identified by block 56, are provided for generating "operator-initiated" input signals that are indicative of the position of one or more movable control elements under the control of the vehicle operator. The operator-initiated input signals are used for establishing control characteristics which, in conjunction with the sensor input signals, are used for regulating actuation of transfer clutch 52. A mode selector, indicated by block 58, permits the vehicle operator to select a desired drive mode. The mode selector 58 can be any suitable manually-actuated or electronically-controlled system capable of generating a mode signal indicative of the particular mode selected by the vehicle operator. Control apparatus 50 includes an electronic controller unit 60, such as a microcomputer, for controlling the hydraulic pressure produced by a hydraulic circuit 62 and supplied to transfer clutch 52 which, in turn, controls the actuated condition of transfer clutch 52 for regulating the ratio of drive torque transferred to front output shaft 38. The sensor signals generated by sensors 54 and 56 and the mode signal generated by mode selector 58 are delivered to controller unit 60 for use in controlling actuation of transfer clutch 52 in the manner set forth hereinafter with greater specificity.

Figure 2:
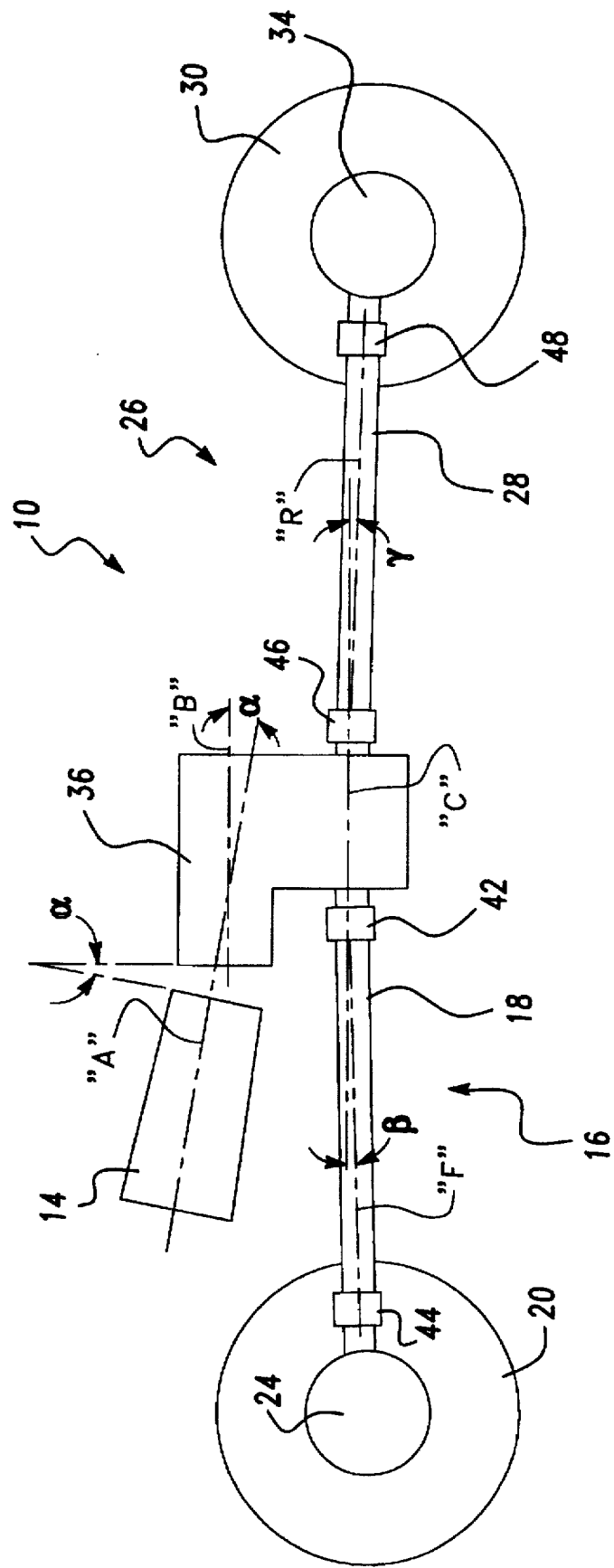
FIG. 2 is a side view of FIG. 1, illustrating the angular relationship between the input of the transfer case and the output of the drivetrain as well as the angular relationship between the front and rear drivelines and the transfer case outputs.
Figure 3:
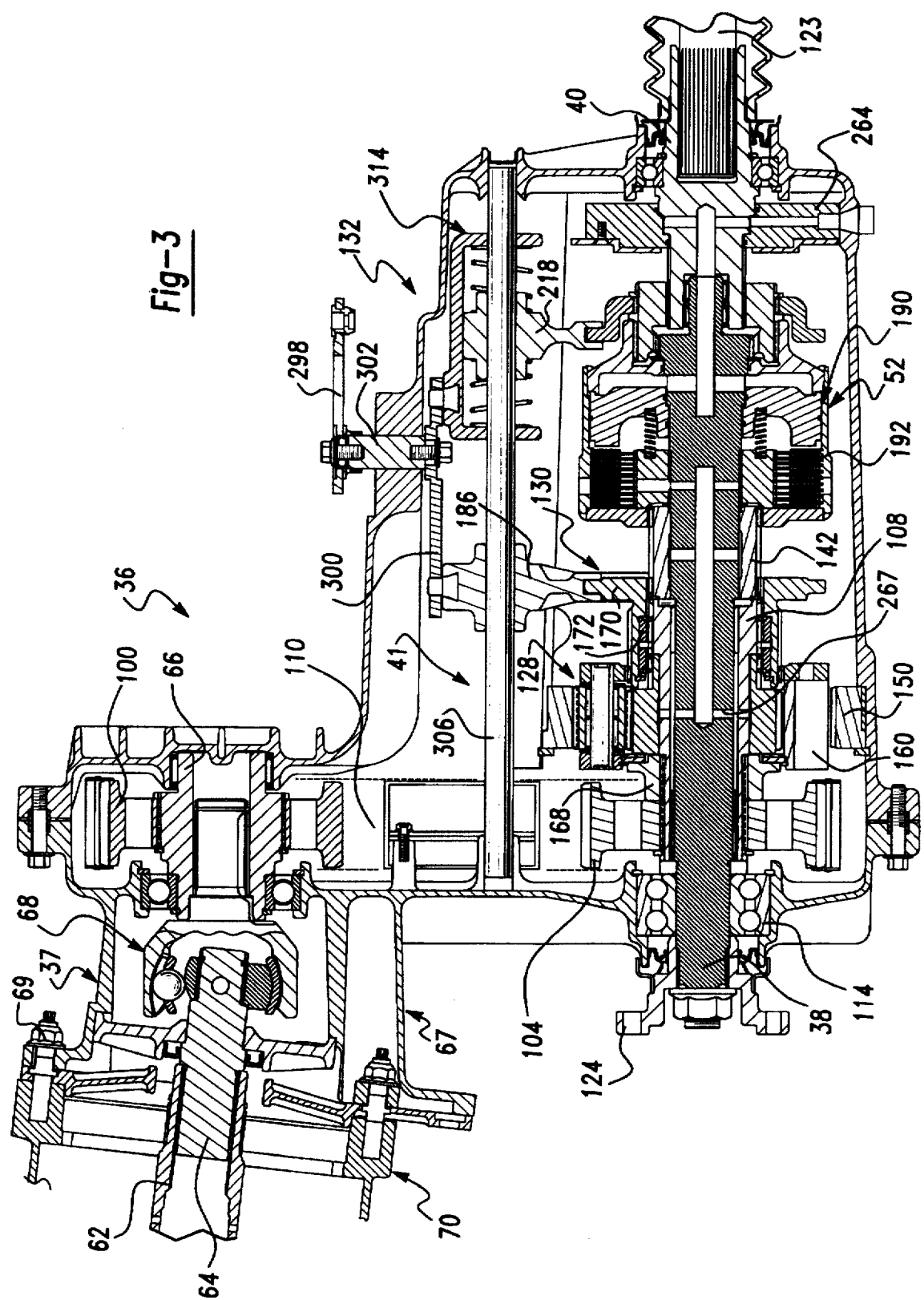
FIG. 3 is a section view of the double offset transfer case of the present invention.
Figure 4:
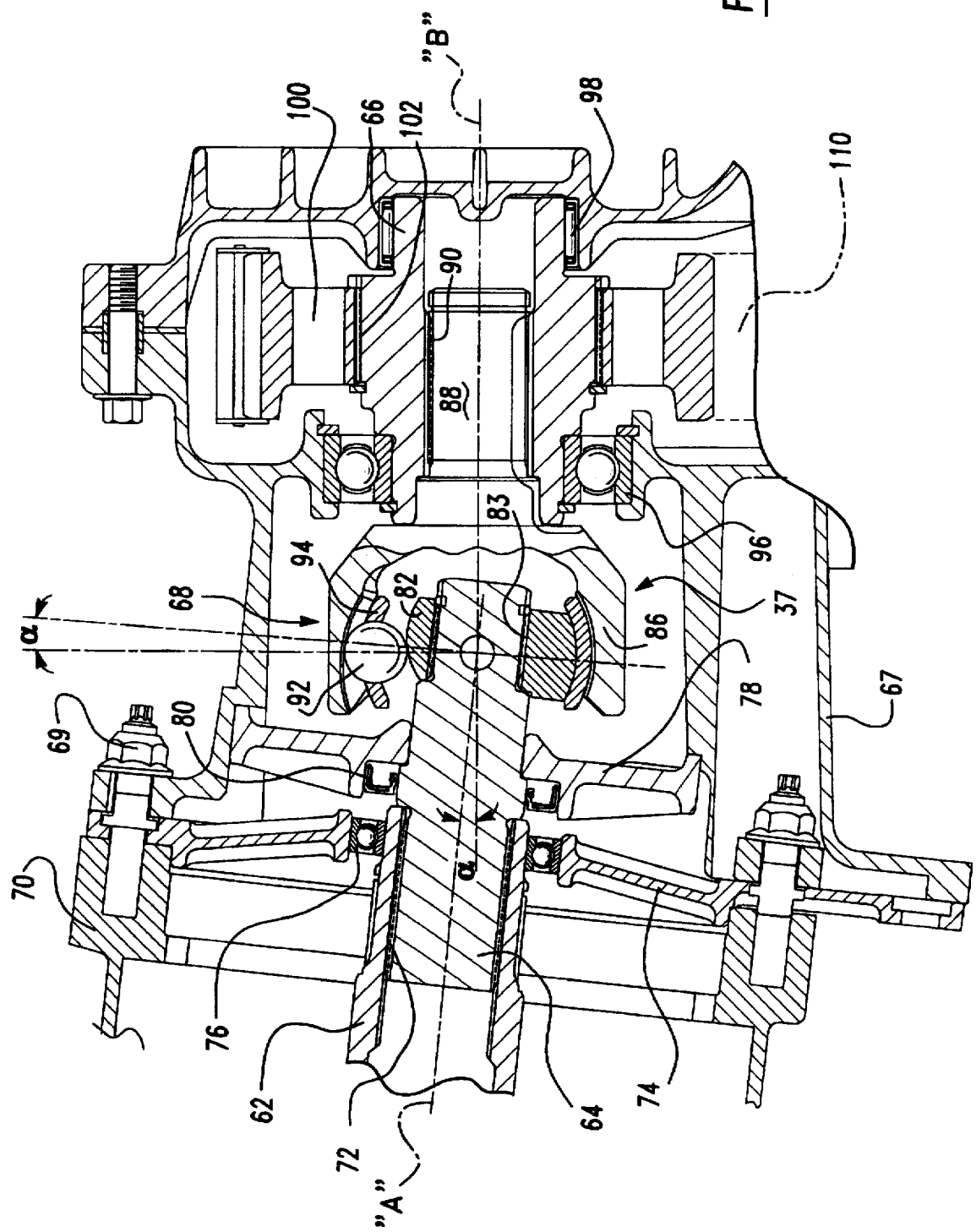
FIG. 4 is an enlarged partial view of FIG. 3 showing the integration of a CV joint into the input section of the transfer case in greater detail.

As best seen from FIGS. 2 and 3, transmission 14 includes an output shaft 62 that is connected to input 37 of transfer case 36. Input 37 includes a first rotary input member or input shaft 64 that is angularly interconnected to a second rotary input member or drive shaft 66 via a constant velocity (CV) universal joint 68. As seen, input shaft 64 is supported for rotation about a first axis of rotation, denoted by reference letter "A". Moreover, drive shaft 66 is supported within transfer case 36 for rotation about a second axis of rotation, denoted by reference letter "B". Rear output shaft 40 is supported for rotation about a third axis of rotation, denoted by reference letter "C". Moreover, front output shaft 38 is supported for rotation relative to rear output shaft 40 and is commonly aligned to rotate about third axis "C". Thus, transfer case 36 is of the "double offset" variety providing a lateral offset between its input and both of its outputs.

Rotary axis "A" of transmission output shaft 62 and transfer case input shaft 64 is vertically coplanar with rotary axis "B" of drive shaft 66. Preferably, front axis "F" and rear axis "R" are both vertically coplanar with rotary axis "C" of transfer case output shafts 38, 40. From FIGS. 2 and 3, it is shown that the rotary axis "B" of drive shaft 66 intersects the rotary axis "A" of input shaft 64 at an input angle, denoted by (α). This angular relationship, permitted via CV joint 68, essentially tips transfer case 36 such that the front departure angle, denoted by (β), between rotary axis "F" of front prop shaft 18 and rotary axis "C" of front output shaft 38 can be substantially reduced. Similarly, this angulated input arrangement provides a reduction in the rear departure angle, denoted by (γ), between rotary axis "R" of rear prop shaft 28 and rotary axis "C" of rear output shaft 40. According to one driveline application now contemplated, an input angle (α) of about five degrees results in departure angles (β) and (γ) of less than two degrees. As noted, such reduced departure angles facilitate the use of less costly universal joints and provide a significant advantage over prior art systems. Obviously, the particular input and departure angles selected will depend on each specific transfer case and driveline application.

With particular attention now drawn to FIGS. 3 through 8, the various components of transfer case 36 will now be described with greater specificity. Transfer case 36 includes a housing 67 that is secured via bolts 69 to transmission housing 70. A splined connection 72 couples transmission output shaft 62 to one end of input shaft 64. Transmission output shaft 62 is shown supported relative to housing 67 via an apertured cover plate 74 and a suitable bearing assembly 76. Likewise, input shaft 64 is shown supported for rotation in housing 67 via an apertured support plate 78 and a suitable seal 80. An inner race 82 of a Rzeppa-type CV joint 68 is fixed via splined connection 83 to the stepped opposite end of input shaft 64 and retained thereon via a retaining ring 84. An outer race 86 surrounds inner race 82 and has an integral stub shaft 88 that is coupled via a splined connection 90 to drive shaft 66. A plurality of balls 92, entrapped by a cage 94, are disposed between and in contact with the arcuate facing surfaces of inner race 82 and outer race 86. It is contemplated that any suitable type and size of CV joint can be used for providing the angular connection at the input of transfer case 36.

Drive shaft 66 is supported from housing 67 by a pair of axially-spaced bearing assemblies 96 and 98 for rotation about the "B" rotary axis. A drive sprocket 100 is fixed via a splined connection 102 to the outer periphery of drive shaft 66 for common rotation therewith and a driven sprocket 104 is fixed via a splined connection 106 for common rotation with an elongated tubular quill shaft 108. A drive chain 110, shown in phantom, interconnects driven sprocket 106 to drive sprocket 100. Quill shaft 108 concentrically surrounds a portion of front output shaft 38 and is supported thereon for relative rotation via suitable bearing assemblies 112 and 113. Moreover, one end of front output shaft 38 is supported from housing 67 via a suitable bearing assembly 114 while its opposite end is piloted in a bore 116 formed in one end of rear output shaft 40 and supported therein via a suitable bearing assembly 118. The opposite end of rear output shaft 40 extends out of housing 67 and is supported therefrom via bearing assembly 120. The portion of rear output shaft 40 which extends beyond housing 67 includes an internally-splined bore 122 adapted to receive the externally-splined yoke 123 of universal joint 46. Similarly, the portion of front output shaft 38 extending out of housing 67 includes a yoke 124 adapted for connection to a mating portion of universal joint 42.

Figure 5:
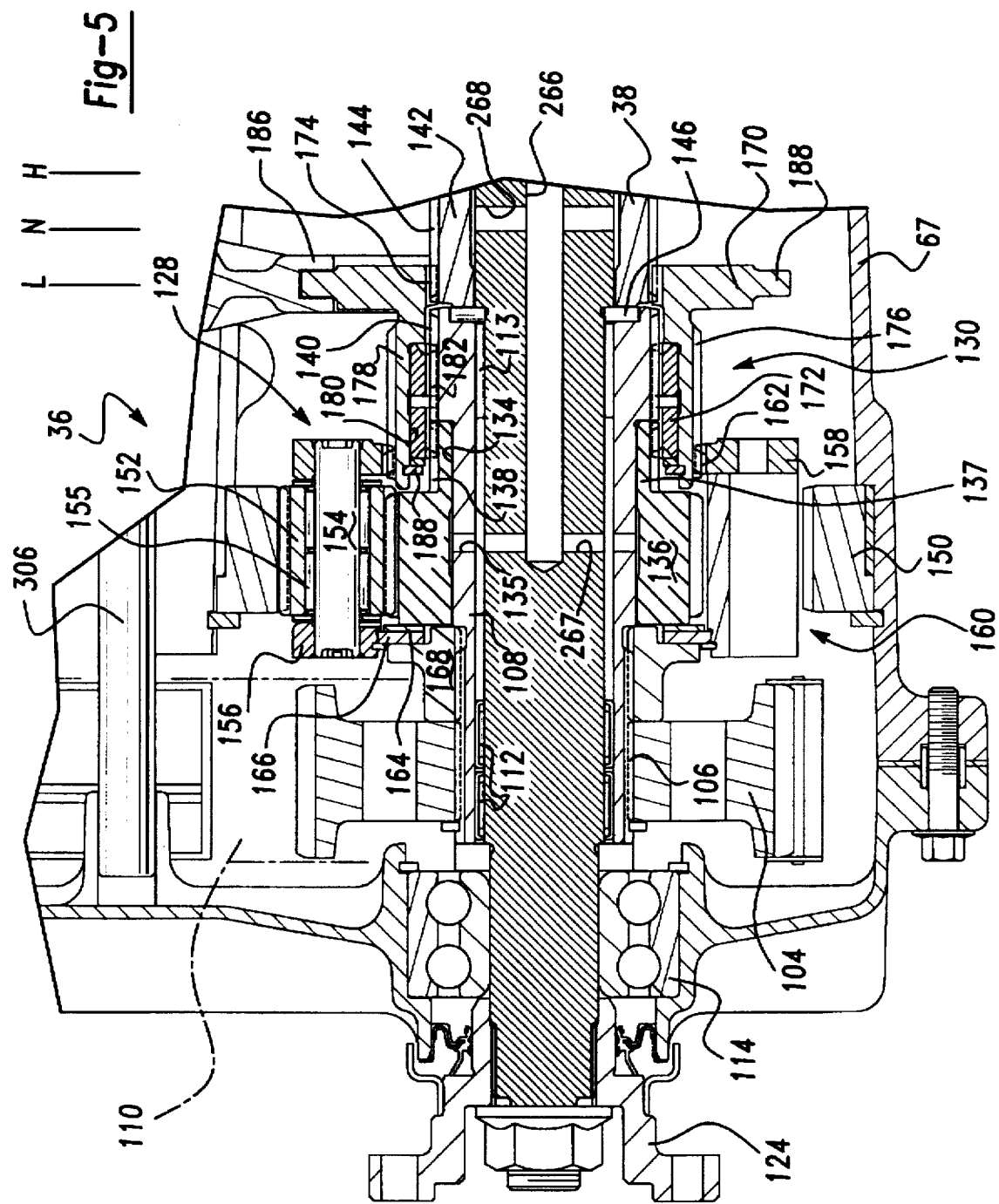
FIG. 5 is another enlarged partial view of FIG. 3 showing the two-speed reduction apparatus and the range clutch in greater detail.

Referring particularly to FIGS. 3 and 5, a two-speed reduction apparatus is shown to include a planetary gear assembly 128 and a range clutch 130. Planetary gear assembly 128 is selectively driven by quill shaft 108 via axial movement of range clutch 130 in response to actuation of a shift mechanism 132 for establishing a high-speed and a low-speed drive connection and a non-driven condition with a drive hub 142. Quill shaft 108 has an external bearing surface 134 on which a sun gear 136 is journally supported. Radial ports 135 in quill shaft provide a lubrication flow path to bearing surface 134. Sun gear 136 includes an integral axial extension 137 on which external clutch teeth 138 are formed. In addition, clutch teeth 140 are formed on an annular end portion of quill shaft 108 such that clutch teeth 140 are located adjacent to, and are alignable with, sun gear clutch teeth 138. Drive hub 142 is journally supported on front output shaft 38 and has external clutch teeth 144 which are located adjacent to, and are alignable with, quill shaft clutch teeth 140. A radial bearing assembly 146 is disposed between drive hub 142 and quill shaft 108 to facilitate relative rotation therebetween.

Planetary gear assembly 128 also includes a ring gear 150 that is fixed to housing 66 so as to be held stationary relative thereto. A plurality of pinion gears 152 (only one shown) are each rotatably supported on a pin 154 via a bearing assembly 155. Each pin 154 extends between fore and aft carrier rings 156 and 158, respectively, which, combined with pins 154 and pinion gears 152, define a planet carrier 160. Pinion gears 152 mesh with sun gear 136 and ring gear 150. Internal clutch teeth 162 are formed on aft carrier ring 158. A suitable thrust washer 164 separates sun gear 136 from a retaining ring 166 that is fixed to front carrier ring 156 and which rotates relative to a spacer hub 168 that is splined to quill shaft 108 for axially locating sun gear 136 relative to driven sprocket 104.

As best seen from FIG. 5, range clutch 130 includes a pair of sleeves 170 and 172 that are selectively engageable with one or more of sun gear 136, quill shaft 108 and drive hub 142 for establishing the two different speed drive connections and the non-driven condition between quill shaft 108 and drive hub 142. In particular, outer sleeve 170 has internal clutch teeth 174 which constantly engage external clutch teeth 144 of drive hub 142. Likewise, outer sleeve 170 has external clutch teeth 176 formed on a drum-like axial extension 178 that are selectively engageable with internal clutch teeth 162 on aft carrier ring 158. Inner sleeve 172 is rotatably supported against an inner recessed bearing surface 180 of outer sleeve extension 178 and retained relative thereto by a snap ring 181. Inner sleeve 172 includes internal clutch teeth 182 that continuously mesh with external clutch teeth 140 of quill shaft 108 and which are also selectively engageable with either sun gear clutch teeth 138 or drive hub clutch teeth 144 depending on the axial position of range clutch 130. A shift fork 186 entraps a radial extension 188 of outer sleeve 170 and is selectively operable to move range clutch 130 between positions L, N, H which respectively represent a Low-Range drive connection, a Neutral non-driven condition and a High-Range drive connection. Range clutch 130 is shown positioned in the L position whereat clutch teeth 182 of inner sleeve 172 engages both sun gear clutch teeth 138 and quill shaft clutch teeth 140 while external clutch teeth 176 on outer sleeve 170 engage carrier clutch teeth 162 and internal clutch teeth 174 on outer sleeve 170 engage drive hub clutch teeth 144. As such, inner sleeve 172 couples sun gear 136 for common rotation with quill shaft 108. Thus, sun gear 136 acts as the input member of planetary gear assembly 128 for driving pinion gears 152 around ring gear 150 such that planet carrier 160 is driven at a reduced or underdrive speed ratio relative to quill shaft 108. Moreover, due to the connection of planet carrier 160 to drive hub 142 via outer sleeve 170 of range clutch 130, drive hub 142 is also driven at the reduced ratio speed relative to quill shaft 108 for establishing the Low-Range drive connection therebetween.

When range clutch 130 is moved rightward to the N position, clutch teeth 182 of inner sleeve 172 are decoupled from sun gear teeth 138 and thus only engage quill shaft clutch teeth 140. Moreover, clutch teeth 176 of outer sleeve 170 are uncoupled from planet carrier teeth 162 and clutch teeth 174 of outer sleeve 170 only engage drive hub clutch teeth 144. Since inner sleeve 172 is free to rotate relative to outer sleeve 170, there is no driven connection between quill shaft 108 and drive hub 142 through planetary gear assembly 128 so as to establish the Neutral non-driven condition. When range clutch 130 is moved farther to the right to its H position, a direct connection is established between quill shaft 108 and drive hub 142. In particular, in the H position, outer sleeve 170 is uncoupled from planet carrier 160 and its internal clutch teeth 174 are engaged with drive hub clutch teeth 144. In addition, clutch teeth 182 of inner sleeve 172 meshingly engage both quill shaft clutch teeth 140 and drive hub clutch teeth 144. Thus, range clutch 130 directly couples drive hub 142 to quill shaft 108 for establishing the High-Range drive connection. An advantageous feature of planetary gear assembly 128 is that sun gear 136 is disconnected from driven connection to quill shaft 108 when the High-Range drive connection is established. As such, planetary gear assembly 128 remains stationary during High-Range drive operation.

Transfer clutch 52 is a hydraulic type, multiple-disc friction clutch assembly 190 operable for applying a fluid pressure to an interleaved clutch pack 192. Clutch assembly 190 includes a housing assembly 194 which connects drive hub 142 to a sliding mode clutch 195 which, in turn, is coupled to rear output shaft 40. Housing assembly 194 includes a front cover plate 196 fixed by a splined connection 198 to clutch teeth 144 of drive hub 142, a cylindrical drum 200 fixed (i.e., welded) at one end to front cover 196, and a rear cover plate 202 fixed (i.e., welded) to the opposite end of drum 200. Rear cover plate 202 has a radial disc-like segment 204 extending between drum 200 and front output shaft 38 and which is sealed relative thereto via an o-ring seal 206. Rear cover plate 202 also includes an axial segment 208 having internal clutch teeth 210 formed thereon. External clutch teeth 212 are provided on the rearward end of front output shaft 38 in generally facing relation to internal clutch teeth 210 on rear cover plate 202. Mode clutch 195 has internal splines 214 that are constantly engaged with external splines 216 of rear output shaft 40 such that mode clutch 195 is supported for rotation with and axial sliding movement on rear output shaft 40 between a "2WD" position and a "4WD" position in response to movement of a second shift fork 218 caused by actuation of shift mechanism 132. An annular fork plate 220 is fixed via splined connection 222 to mode clutch 195 and is entrapped within a groove 224 of second shift fork 212. As will be detailed, shift mechanism 132 causes coordinated movement of shift forks 186 and 218 for establishing the various available drive modes.

Figure 6:
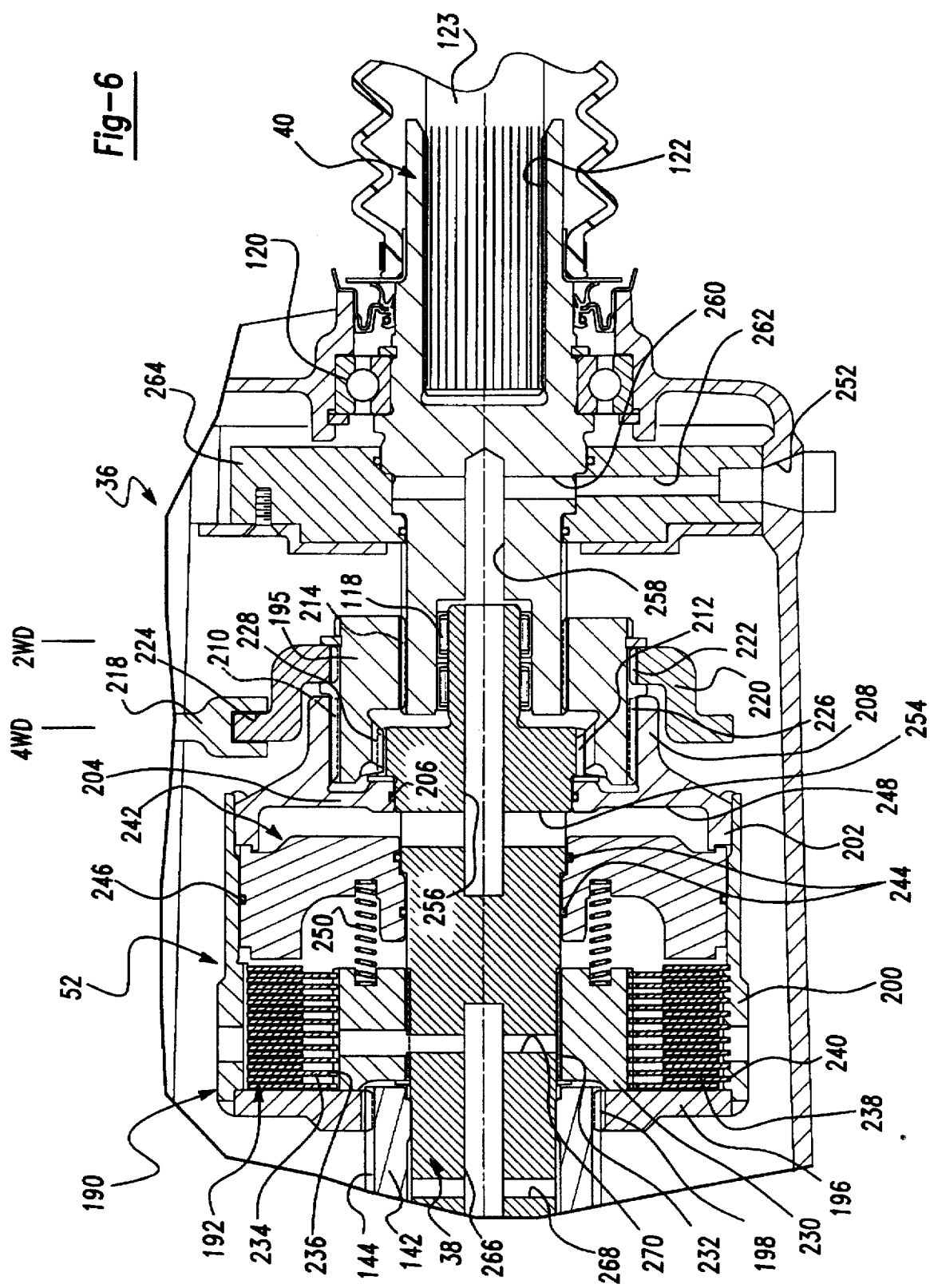
FIG. 6 is also an enlarged partial view of FIG. 3 showing the on-demand transfer clutch and the mode clutch in greater detail.

As shown in FIG. 6, mode clutch 195 is in its "4WD" position whereat its external clutch teeth 226 are meshed with internal clutch teeth 210 of rear cover plate 202 and its internal clutch teeth 228 are meshed with external clutch teeth 212 of front output shaft 38. In this position, mode clutch 195 establishes a direct coupling between drive hub 142 (via housing assembly 194) and both rear output shaft 40 and front output shaft 38. Thus, drive torque is transferred equally to front and rear output shafts 38 and 40 for establishing a Part-Time four-wheel drive mode. When mode clutch 195 is moved to its "2WD" position, it is uncoupled from direct engagement with front output shaft 38 such that drive torque is only transferred from drive hub 142 through housing assembly 194 and mode clutch 195 to rear output shaft 40 for establishing a Two-Wheel drive mode. Specifically, internal clutch teeth 228 of mode clutch 195 are de-coupled from external clutch teeth 212 of front output shaft while its external clutch teeth 226 remain meshed with internal clutch teeth 210 on rear cover plate 202. In this position of mode clutch 195, any drive torque to be transferred from drive hub 142 to front output shaft 38 must be provided "On-Demand" via actuation of transfer clutch 52.

With continued reference to FIG. 6, clutch assembly 190 is also shown to include a hub 230 fixed via a splined connection 232 to front output shaft 38. A plurality of inner clutch plate 234 are fixed via a splined connection 236 to the outer periphery of hub 230. A plurality of outer clutch plates 238 are fixed via a splined connection 240 to outer drum 200 and are alternatively interleaved with inner clutch plates 234. Located adjacent to hub 230 is a piston 242 that is slidable relative to clutch pack 192. Both of the inner and outer peripheries of piston 242 are sealed in a fluid-tight manner via seals 244 and 246 to form a oil chamber 248. A spring 250 is disposed under compression between piston 242 and clutch hub 230 for normally urging piston 242 toward oil chamber 248. Oil chamber 248 is in fluid communication with an oil port 252 of transfer case 36 via a set of first radial passages 254 and a first longitudinal passage 256 formed in front output shaft 38, a second longitudinal passage 258 and a set of second radial passages 260 formed in rear output shaft 40, and a third radial passage 262 formed in a bearing block 264.

When the pressure of the fluid supplied to oil chamber 248 from hydraulic system 62 through the above-noted passages is of a sufficient magnitude to overcome the biasing of spring 250, then piston 242 moves leftwardly (as viewed in FIG. 6) for bringing interleaved clutch plates 234 and 238 of clutch pack 192 into frictional contact with each other. In particular, piston 242 is adapted to exert a clutch "engagement" or clamping force on clutch pack 192 which is proportional to, or is a known function of, the magnitude of the hydraulic pressure supplied to oil chamber 248 via hydraulic circuit 62. Thus, transfer clutch 52 is operable for transferring drive torque from drive hub 142 and housing assembly 194 to front output shaft 38. In other words, transfer clutch 52 is capable of varying the torque distribution ratio between rear output shaft 40 and front output shaft 38. While not shown, a conventional gerotor-type lube pump is provided for supplying lubricant to quill shaft 108, drive hub 142 and clutch hub 230 via a longitudinal passage 266 formed in front output shaft 38 that communicates with radial ports 267, 268 and 270, respectively.

Figure 7:
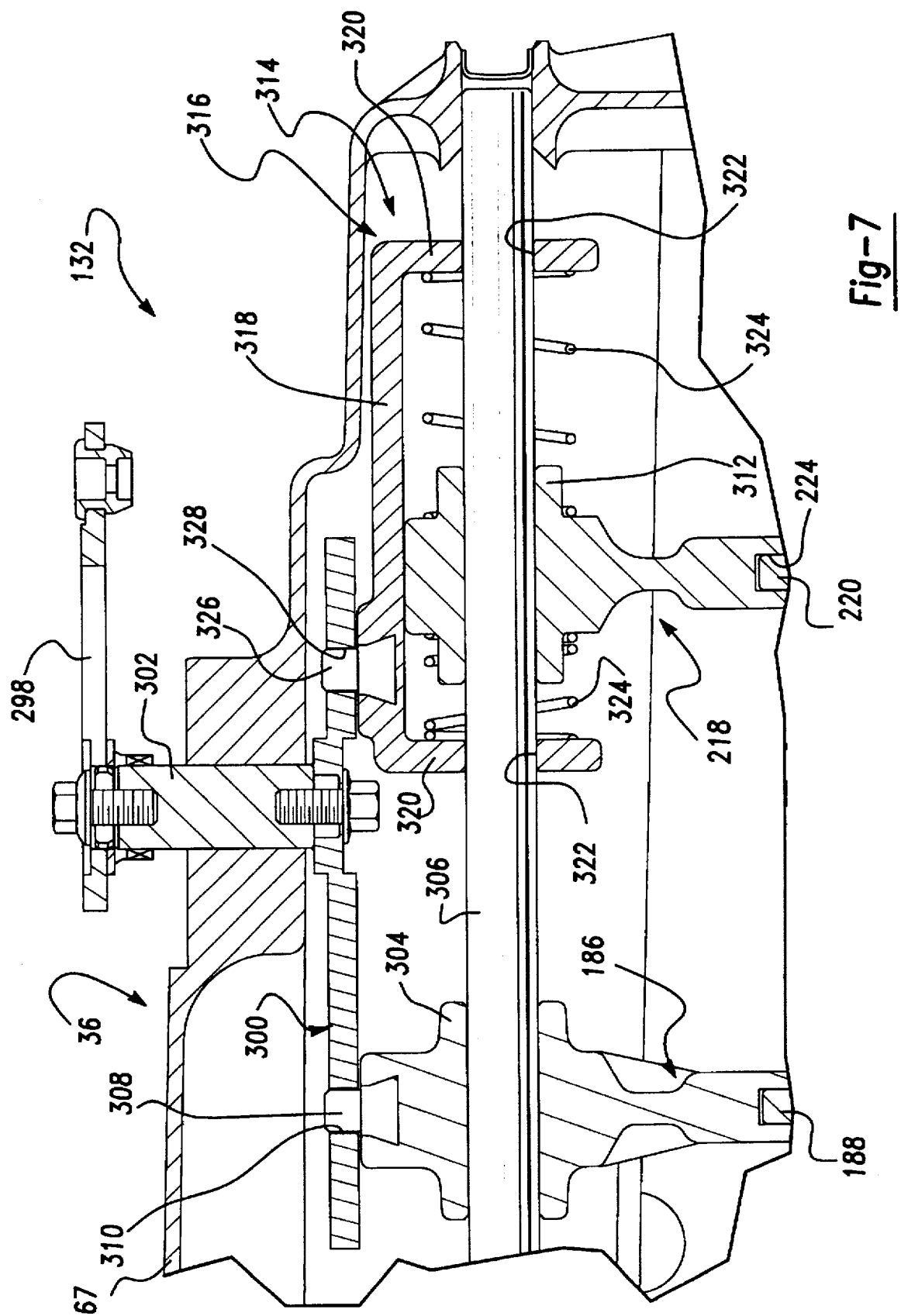
FIG. 7 is yet another enlarged partial view of FIG. 3 showing the manually-actuated shift mechanism provided for shifting the transfer case into various drive modes.
Figure 8:
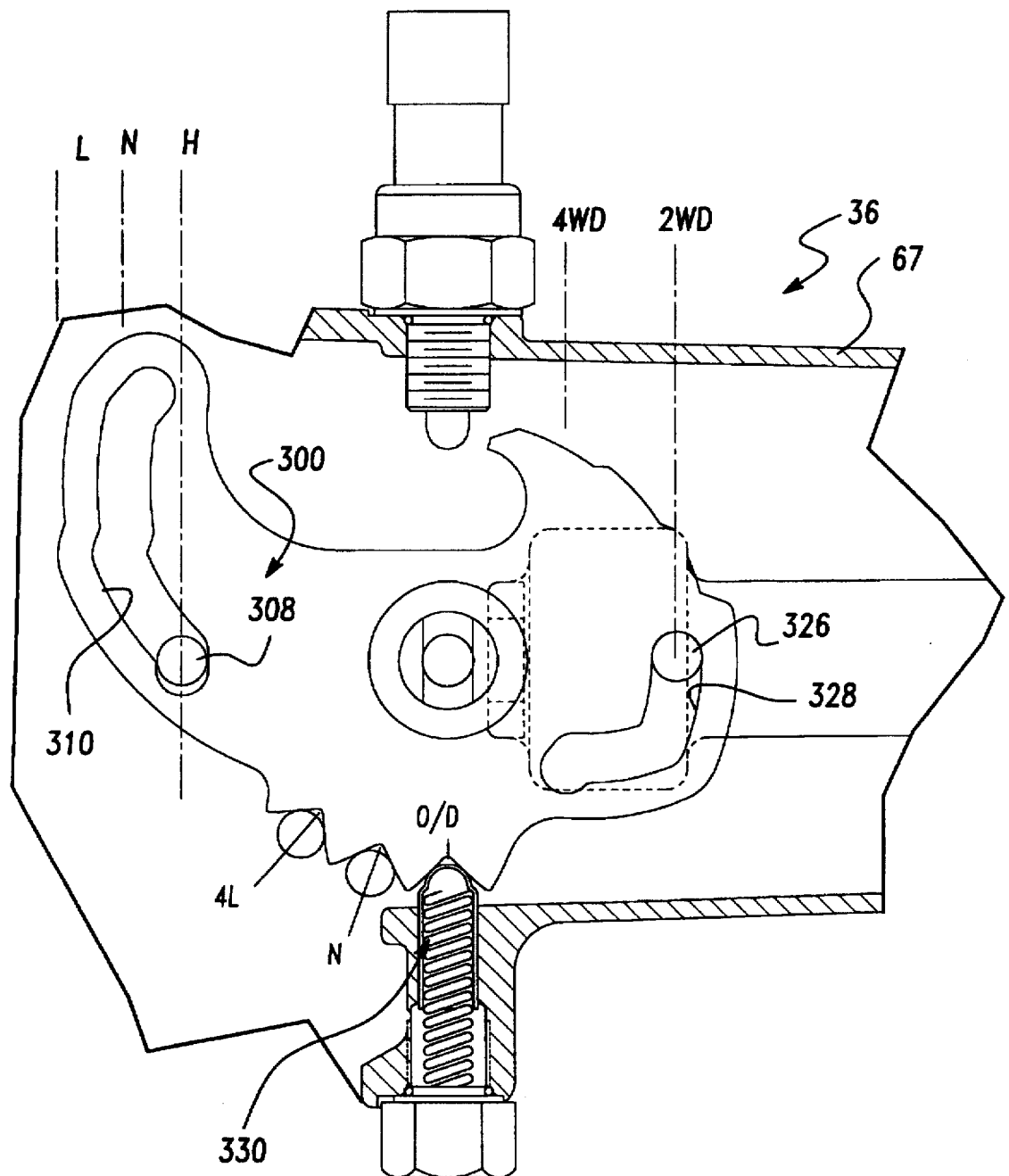
FIG. 8 is a side view of the sector plate shown in FIG. 7 that is rotated by the shift mechanism for moving the range clutch and the mode clutch.

Referring now to FIGS. 7 and 8, the various components associated with shift mechanism 132 for controlling coordinated movement of range clutch 130 and mode clutch 195 are shown with greater specificity. According to the construction shown, shift mechanism 132 is adapted to be coupled via conventional linkages to a manually-operable shift lever that is located within the passenger compartment of the motor vehicle and which is operable for permitting the vehicle operator to select operation of transfer case 36 in one of the available drive modes. In general, shift mechanism 132 includes a pivotable lever 298 that is coupled to a sector plate 300 via an actuator shaft 302. Shift forks 186 and 218 are each coupled to sector plate 300 via a follower pin and guide slot arrangement for changing the rotary output (i.e., torque) of lever 298 and sector plate 300 into axially-directed forces capable of moving range clutch 130 and mode clutch 195. In particular, shift fork 186 includes a tubular section 304 that is slidingly supported on a shaft 306 mounted to housing 67. A follower pin 308 is fixed to shift fork 186 and is confined within a range slot 310 formed in sector plate 300. The contour of range slot 310 is such that rotation of sector plate 300 in a first direction will shift range clutch 130 from the L position, through the N position, and into the H position. Obviously, reverse rotation of sector plate 300 results in the movement of range clutch 130 through the positions in opposite order.

Shift fork 218 is similar to shift fork 186 and likewise includes a tubular section 312 that is slidingly supported on shaft 306. A spring-biasing mechanism 314 is provided for applying a biasing load on shift fork 218 for assisting in completing engagement of mode clutch 195 with clutch teeth 212 on front output shaft 38 upon movement to its "4WD" position. Spring-biasing mechanism 314 is adapted to provide a self-centering biasing load on mode clutch 195 to ensure lock-up after completion of the movement of sector plate 300 in those conditions where slight speed differences create blockage of clutch teeth 228 on mode clutch 195 from passing into engagement with clutch teeth 212 on front output shaft 38 until the blockage is eliminated. To this end, an angled bracket 316 is provided which has a leg section 318 and two bent arm sections 320 extending therefrom. Apertures 322 are formed in arm sections 320 through which shaft 306 extend. A pair of biasing springs 324 act between each arm section 320 and shift fork 218 for normally centering shift fork in a balanced equilibrium condition. A follower pin 326 is fixed to leg section 318 of bracket 316 and is disposed within a mode slot 328 formed in sector plate 300. The contour of mode slot 328 is engineered to produce axial sliding movement of mode clutch 195. Thus, the contour of mode slot 328 and range slot 310 are designed to cause coordinated movement of mode clutch 195 and range clutch 130 in response to rotation of sector plate 300 for establishing each of the available drive modes.

According to the particular embodiment disclosed, sector plate 300 is designed to coordinate movement of range clutch 130 and mode clutch 195 to establish three different operational modes. These modes include an On-Demand high-range drive mode, a Neutral non-driven mode, and a Part-Time Four-Wheel low-range drive mode. In the On-Demand high-range drive mode, range clutch 130 is located in its H position and mode clutch 195 is located in its "2WD" position. In the Neutral mode, range clutch 130 is located in its N position and mode clutch 195 is maintained in its "2WD" position. Finally, in the Part-Time Four-Wheel low-range drive mode, range clutch 130 is located in its L position and mode clutch 195 is located in its "2WD" position. A detent popper 330 is provided for positively locating sector plate 300 in one of three different rotated positions, as indicated by the O/D (On-Demand high-range), N (Neutral) and 4 L (Part-Time Four-Wheel low-range) sector positions. A mode switch 332 is arranged to selectively engage a cam portion 334 of sector plate 300. When sector plate 300 is rotated to its O/D position, indicating selection of the On-Demand high-range drive mode, a corresponding mode signal is sent by mode switch 332 to controller unit 60. Likewise, when sector 300 is rotated to either of its N or 4 L positions, a corresponding mode signal is sent by mode switch 332 to controller unit 60.

It is also contemplated that transfer case 36 could easily be adapted to provide a Two-Wheel high-range drive mode and/or a Part-Time Four-Wheel high-range drive mode in addition to the above-noted modes. In the Two-Wheel high-range drive mode, range clutch 130 would be located in its H position and mode clutch 195 would be located in its "2WD" position. If the Part-Time Four-Wheel high-range drive mode is made available, range clutch 130 would be located in its H position and mode clutch 195 would be located in its "4WD" position. Such additional drive modes simply require modification to the profiles of range slot 310 and mode slot 328 to provide the desired coordinated movement of range clutch 130 and mode clutch 195. Corresponding detented sector positions for sector plate 300 would be provided thereon. Moreover, in each of these drive modes, mode switch 332 would be operable to engage a modified cam portion 334 of sector plate 300 to signal controller unit 60 to return or maintain transfer clutch 52 in its non-actuated condition. Power transfer system 10 could be equipped with an axle disconnect mechanism or locking hubs in front driveline 16 which, under the control of control apparatus 50, is operable for disconnecting front prop shaft 18 from front axle assembly 22 when the Two-Wheel high-range drive mode is selected. As a further alternative option, the profiles of range slot 310 and mode slot 328 can be modified to also provide an On-Demand low-range drive mode with range clutch 130 located in its L position and mode clutch 195 located in its "2WD" position.

Figure 9:
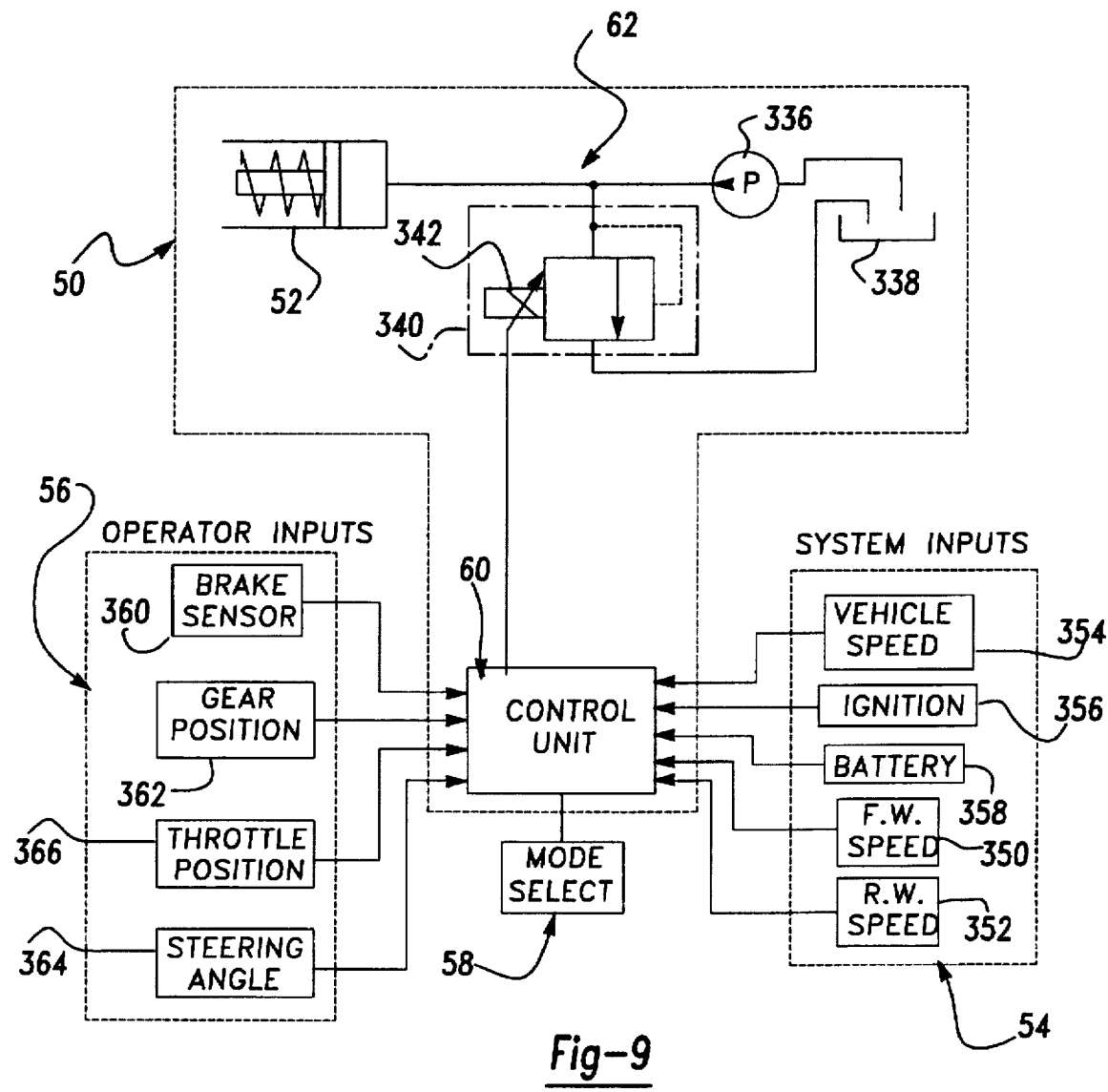
FIG. 9 is a block diagram of a control system used with the transfer case of the present invention.

As shown in FIG. 9, hydraulic Circuit 62 includes a hydraulic pump 336 for pressurizing the hydraulic fluid drawn from a reservoir tank 338. The outlet of pump 336 is connected to inlet port 252 of transfer case 36 and thus communicates with oil chamber 248 of transfer clutch 52. The outlet of pump 336 is also connected back to reservoir tank 338 through an electromagnetic control valve 340. Control valve 340 has a solenoid assembly 342 which is connected to controller unit 60 for receiving control signals therefrom. In particular, control valve 340 is operable to vary the return flow to reservoir tank 338 via a passage whose opening degree corresponds to the magnitude of the electrical control signal supplied to solenoid assembly 342 by controller unit 60. In this way, electromagnetic control valve 340 can vary the fluid pressure applied to oil chamber 248 of transfer clutch 52 by varying its opening degree under the command of controller unit 60. Variations in the fluid pressure result in a corresponding change in the clutch engagement force applied by piston 242 to interleaved clutch pack 192. For example, control valve 340 can have a spool movable in response to the outlet pressure of pump 336 and the electromagnetic force generated in response to energization of solenoid assembly 342 for controlling the fluid pressure supplied to oil chamber 248 according to the magnitude of the control signal supplied thereto.

In its most basic sense, the On-Demand high-range drive mode is provided for automatically and instantaneously transferring drive torque to front wheels 20 during the occurrence of slippage of rear wheels 30 that are typically associated with low tractive road conditions. Once the On-Demand high-range drive mode is selected, power transfer system 10 functions to continuously monitor and regulate the "On-Demand" operation in a manner that is independent of any deliberate action by the vehicle operator. Preferably, the magnitude of the clutch engagement force applied to transfer clutch 52 is proportional to the magnitude of the electrical control signal (i.e., percentage duty cycle) applied to solenoid assembly 342. Thus, the amount of drive torque transferred through transfer clutch 52 to front output shaft 38 is also proportional to the magnitude of the control signal. As such, the distribution ratio of drive torque between front output shaft 38 and rear output shaft 40 of transfer case 36 may be controllably varied between a two-wheel drive state (0:100 ratio) and a part-time four-wheel drive state (50:50 ratio) as a function of changes in the magnitude of the control signal for optimizing the tractive performance characteristics associated with operation in the On-Demand high-range drive mode.

With continued reference to FIG. 9, a block diagram of a control system associated with power transfer system 10 is shown. Preferably, controller unit 60 is an electronic control module having signal processing and information storage capabilities. In addition, first sensors 54 are shown as a group of various "system" sensors that are provided for detecting and signaling specific dynamic and operational characteristics of the motor vehicle. The input signals generated by the "systems" sensor group are delivered to electronic controller unit 60. Preferably, these sensors include a front speed sensor 350 for sensing the rotational speed ($n_F$) of front prop shaft 18, a rear speed sensor 352 for sensing the rotational speed ($n_R$) of rear prop shaft 28, a vehicle speed sensor 354 for sensing a vehicle speed (V), an ignition switch 356 for signaling the operational status of the vehicle, and a battery input 358 for powering electronic control unit 60. In vehicles equipped with an anti-lock brake system (ABS), the original equipment ABS sensors provided at each wheel can be used for determining an "average" front drive shaft speed and rear drive shaft speed. Alternatively, front and rear speed sensors 350 and 352, respectively, can be arranged for directly measuring the speed of front output shaft 38 and rear output shaft 40, respectively. Moreover, it is possible for vehicle speed sensor 354 to be eliminated with the vehicle speed signal (V) being computed from the front rotational speed signal ($n_F$) generated by front speed sensor 350. It is to be understood that any suitable speed sensing arrangement capable of generating a signal indicative of the rotational speed of a shaft is fairly within the scope of the present invention.

The control system also utilizes various "operator-initiated" inputs, as generally categorized by second sensors 56. These inputs include a brake sensor 360 for sensing when the vehicle operator is applying the brakes, a gear position sensor 362 for sensing a gear position of transmission 14, a steering angle sensor 364 for detecting the magnitude of a steering angle ($\phi$), and an accelerator sensor for sensing an accelerating condition of the vehicle. Preferably, the accelerator sensor is a throttle position sensor 366 for sensing the degree to opening of a throttle valve associated with engine 12 or for sensing the degree of depression of an accelerator pedal, and is operable to produce a throttle position signal (A). The operator-initiated input signals are delivered to controller unit 60 where they are used, in conjunction with the system input signals, to further control "On-Demand" operation.

To provide means for the vehicle operator to shift power transfer system 10 into one of the available operational modes, mode selector 58 can take the form of any mode selector device which is under the control of the vehicle operator for generating a mode signal indicative of the specific mode selected. In association with shift mechanism 132, the mode selector device may be a manually-operable shift lever sequentially movable between a plurality positions corresponding to the available operational modes which, in conjunction with a suitable electrical switch arrangement (i.e., mode switch 332), generates a mode signal indicating the particular mode selected. Thus, vehicle operator is given the option of deliberately choosing between the various operative drive modes.

Figure 10:
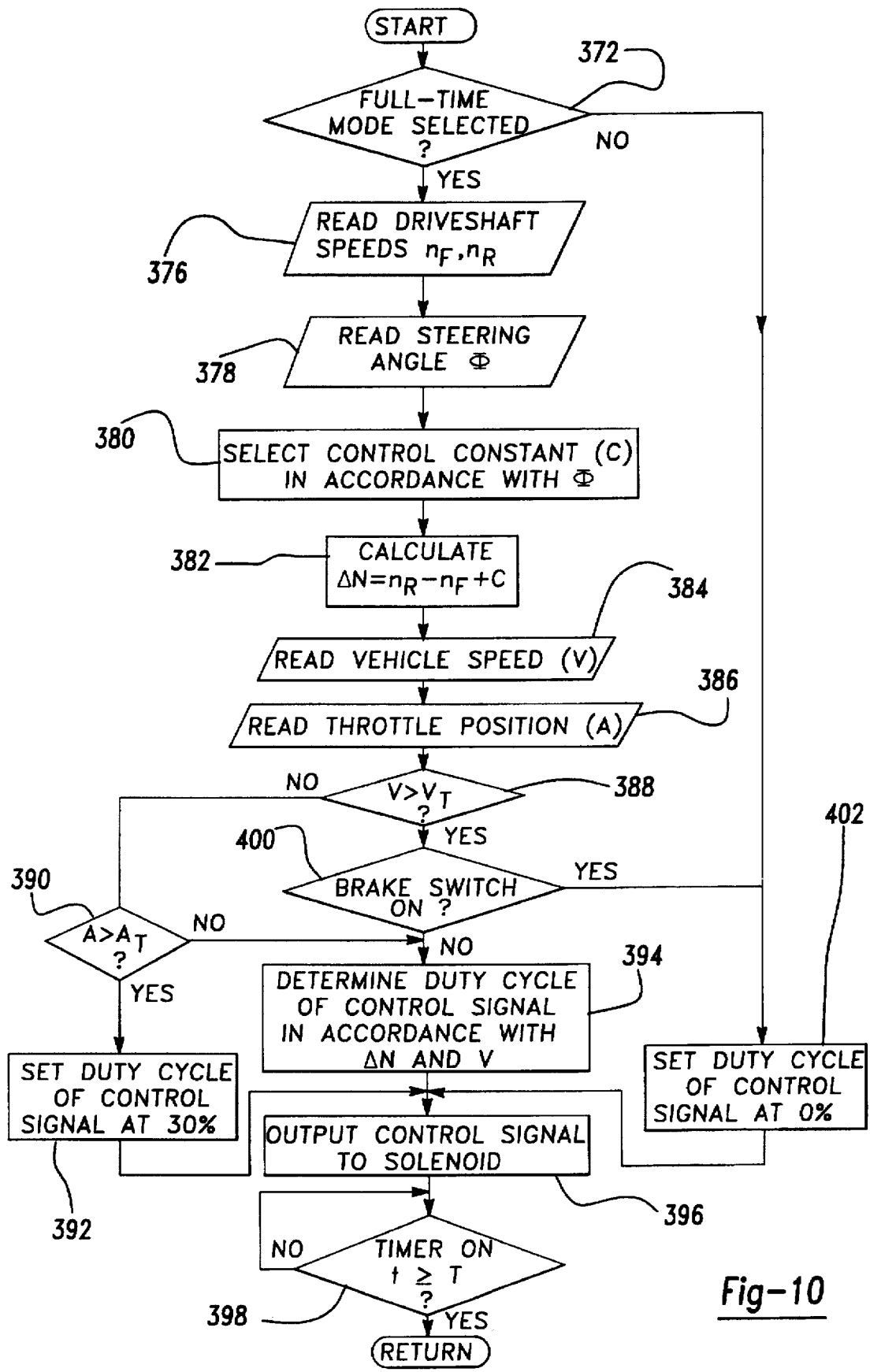
FIG. 10 is a flow chart depicting a control sequence for the operations performed by the control system of FIG. 9.
Figure 12:
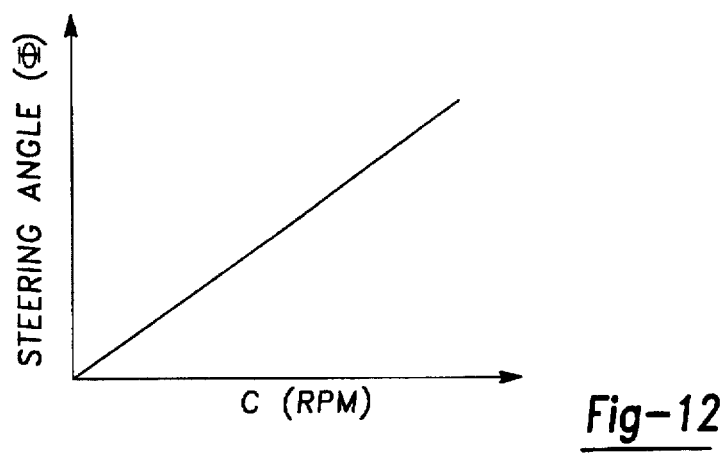
FIG. 12 is an exemplary plot of a relationship between steering angle and a control characteristic used for modifying the speed differential signal.

With reference now to FIG. 10, a control sequence for the selection and the subsequent automatic control of the On-Demand high-range drive mode is shown in a flow chart 370. In general, flow chart 370 represents a sequence of operations performed by electronic controller unit 60 which are diagrammatically shown in block form. When mode switch 332 signals selection of the On-Demand high-range drive mode, as indicated by block 372, a succession of control steps are repeated for selecting the value of the electric control signal to be applied to solenoid assembly 342. Preferably, the control signal is derived in accordance with various predefined relationships between the current value of a front and rear wheel speed differential ($\Delta N$) and vehicle speed (V), as modified by the current value of the steering angle ($\phi$) and other operator-initiated inputs. Block 376 is representative of the control step in which the current value of the rotational speed of front prop shaft 18 ($n_F$) and rear prop shaft 28 ($n_R$) are read. Block 378 indicates the step of reading the value of steering angle ($\phi$) as detected by steering angle sensor 364. Block 380 represents the operation of selecting a control characteristic (C) in accordance with the steering angle ($\phi$). FIG. 12 illustrates a plot of an exemplary relationship, which may be stored as a look-up table or computed from an arithmetic equation, which correlates the control characteristic (C) as a function (i.e., linear) of the detected steering angle ($\phi$). Next, block 382 represents the step of calculating the value of a speed differential ($\Delta N$) according to the equation $$\Delta N = n_R - n_F + C$$

Blocks 384 and 386 indicate the steps of reading the current value of the vehicle speed (V) as detected by vehicle speed sensor 354 and the throttle position (A) as detected by throttle position sensor 366, respectively. As shown in block 388, controller unit 60 determines whether the vehicle speed (V) exceeds a predefined threshold value ($V_T$) such as, for example, 5 mph. If the vehicle speed is less than the threshold value ($V_T$), a second determination is made (block 390) as to whether the value of the throttle position (A) exceeds a predefined threshold value ($A_T$) such as, for example, a 50% accelerator pedal depression angle. If the vehicle speed (V) is less than its threshold value ($V_T$) and the throttle position (A) exceeds its threshold value ($A_T$), then the magnitude (i.e., percentage of duty cycle) of the electrical control signal is set as a preset value, such as 30% duty cycle, as indicated by block 392. In this manner, power transfer system 10 is adapted to transfer torque to front wheels 20 in response to quick acceleration at low vehicle speeds to inhibit wheel slip. However, if the value of the throttle position (A) is less than its threshold value ($A_T$), then the magnitude of the duty cycle for the control signal is set in accordance with predefined relationships between the speed differential ($\Delta N$) and vehicle speed (V), as indicated by block 394. Block 396 represents the step of outputting the electrical control signal to solenoid 342 for developing the desired amount of torque transfer, if any, across transfer clutch 52. As shown in block 398, a timer circuit within controller unit 60 is actuated simultaneously with energization of solenoid 342 for maintaining such energization for a predetermined time period (T). Once the period of energization (t) equals the predetermined time period (T) (or $t \leq T$), controller unit 60 repeats the control routine.

To enhance steering control, block 400 is indicative of the control step between steps 388 and 394 for determining whether the vehicle operator is applying the brakes when the vehicle speed (V) is greater than the threshold value ($V_T$). Accordingly, if the vehicle operator is attempting to stop the vehicle, by applying the brakes (as sensed by brake sensor 360) during an occurrence of a low traction road condition and the vehicle speed (V) is greater than the predefined threshold ($V_T$), then controller unit 60 sets the magnitude of the control signal sent to solenoid 342 to 0% (block 402) for de-actuating transfer clutch 52 and disabling the "On-Demand" drive feature. This control sequence prevents simultaneous braking and On-Demand four-wheel drive operation for providing the vehicle operator with greater steering and braking control. However, during the occurrence of a low traction condition when brake sensor 360 signals controller unit 60 that the vehicle operator is not applying the brakes, electronic controller unit 60 automatically energizes solenoid 342 (block 396) for actuating transfer clutch 52 in accordance with the relationships generally denoted by block 394. If either the Part-Time Four-Wheel low-range drive mode or Neutral mode are selected upon manipulation of mode selector 58, then mode switch 332 signals controller unit 60 to return or maintain transfer clutch 52 in its totally de-actuated state by again setting the duty cycle sent to solenoid 342 to 0% (block 402).

Figure 11:
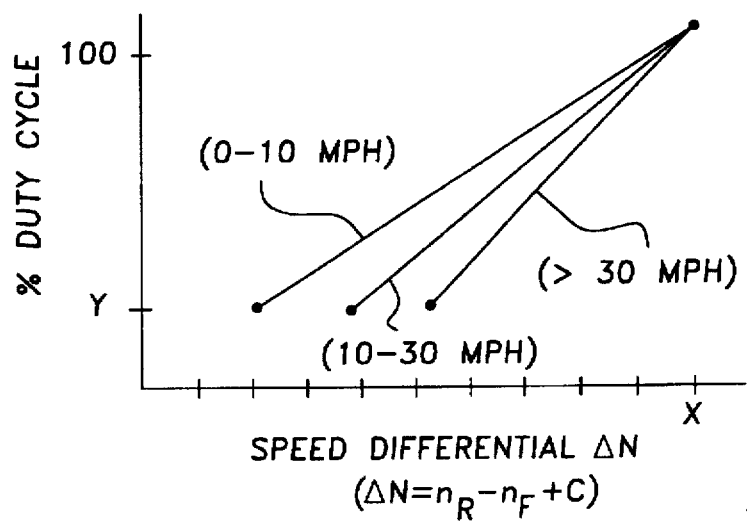
FIG. 11 illustrates exemplary plots of relationships between wheel speed differential signals at various vehicle speed ranges and the electrical control signal supplied by the control system for controlling the amount of torque transferred through the transfer clutch during "on-demand" operation.

With particular reference to FIG. 11, a set of exemplary plots used for establishing the magnitude of the duty cycle signal in response to the current value of the speed differential ($\Delta N$) and the vehicle speed (V) during "On-Demand" operation as diagrammatically referred to by block 394 in FIG. 10, will now be detailed. As seen, power transfer system 10 is programmed to correlate the percentage duty cycle of the electrical control signal to a range of speed differential ($\Delta N$) values. In general, the percentage duty cycle for the control signal increases from a minimum actuation value (Y%) to a maximum actuation value (100%) as the value of the speed differential ($\Delta N$), within a particular vehicle speed range, increases from a minimum speed differential limit to a maximum speed differential limit (X). As such, when the value of the speed differential ($\Delta N$) is less than the minimum speed differential limit, no drive torque is transferred through transfer clutch 52 to front output shaft 38 and the vehicle operates in an otherwise normal Two-Wheel drive mode of operation. However, when the value of the speed differential ($\Delta N$) exceeds the minimum differential limit, "On-Demand" four-wheel drive operation is established by supplying a control signal to solenoid 342 having a duty cycle value greater than (Y%). Thus, the minimum actuation duty cycle (Y%) for the control signal correlates to the point at which sufficient frictional engagement between interleaved clutch plates 234 and 238 results in the delivery of a portion of the total drive torque to front output shaft 38 of transfer case 36 for initiating "On-Demand" four-wheel drive operation. Preferably, the maximum value (X) of the speed differential ($\Delta N$) correlates to the maximum actuation duty cycle (i.e., 100%) at which point the maximum clutch engagement force is generated for completely locking-up clutch plates 234 and 238. During On-Demand operation, a reduction in the magnitude of the control signal sent to solenoid 342 will result in a corresponding reduction in the fluid pressure supplied to oil chamber 248 of transfer clutch 52.

Figure 13:
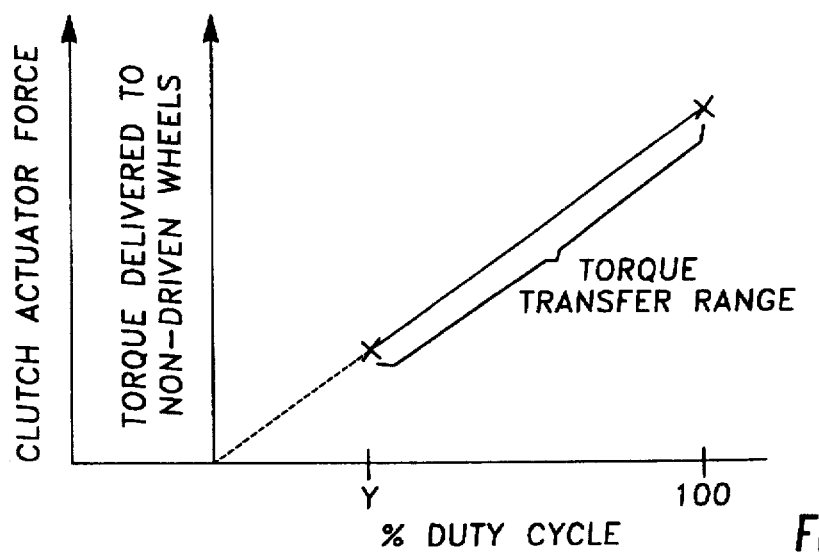
FIG. 13 graphically illustrates the relationship of the electrical control signal with respect to the drive torque transferred through the transfer clutch to the non-driven wheels.

As best seen from FIG. 13, an exemplary linear relationship between the magnitude of the duty cycle supplied to solenoid 342 and the clutch engagement force generated and, in turn, the amount of torque delivered across transfer clutch 52 is shown. When the vehicle operator selects a operational mode via mode selector 58 other than the On-Demand high-range drive mode, sector plate 300 is caused to rotate to the particular sector position corresponding to the selected drive mode. As is common to most part-time systems, it is contemplated that power transfer system 10 will inhibit completion of the shift into either of the Neutral mode or the Part-Time Four-Wheel low-range mode unless the vehicle speed (V) is less than the threshold value ($V_T$) and transmission 14 is in a Neutral gear position, as indicated by gear position sensor 362.

Figure 14:
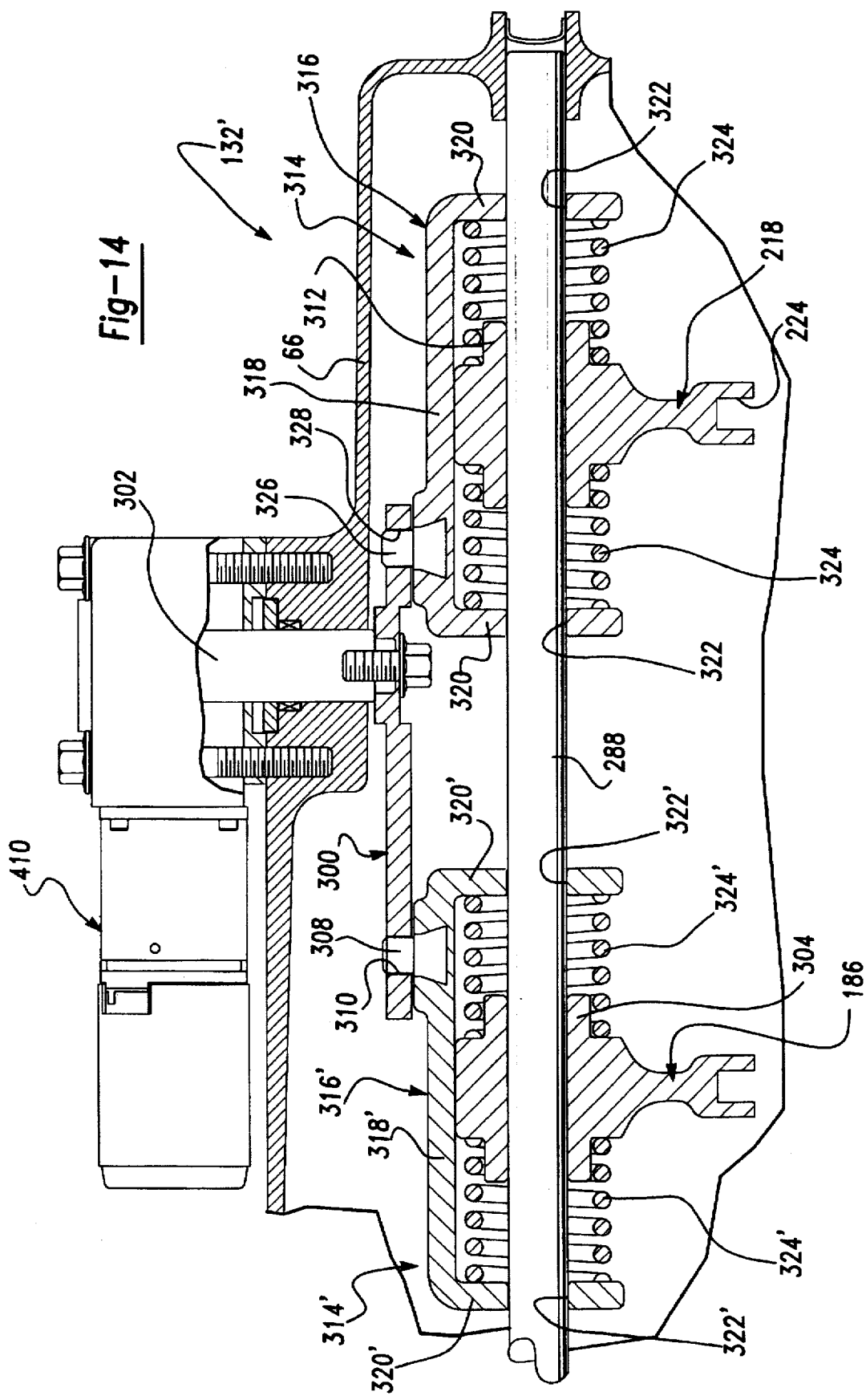
FIG. 14 is a view, similar to FIG. 7 illustrating an electrically-controlled shift mechanism adapted for use with the transfer case of the present invention.

FIG. 14 is a view, similar to FIG. 7, illustrating an alternative shift mechanism 132' used in association with an electrically-controlled shift system wherein the vehicle operator actuates push-button or rotary switches for actuating a rotary-driven actuator. As seen, identical or substantially similar functioning components of shift mechanism 132' that were previously disclosed in association with shift mechanism 132 are identified by the same reference numerals. Preferably, the actuator is an electric gearmotor 410 having a rotary output (not shown) coupled to actuator shaft 302. Thus, gearmotor 410 is adapted to controllably rotate sector plate 300 between its various rotated positions in response to control signals sent to gearmotor 410 from controller unit 60. An encoder 411 is connected to gearmotor 410 for providing an appropriate signal to controller unit 60 of the rotated position of sector plate 300. Controller unit 60 generates the control signals in response to the mode signals delivered thereto upon the vehicle operator actuating the selection switches or push-buttons.

As is also seen, shift fork 186 is operably associated with a spring-biasing mechanism 314'. As before, spring-biasing mechanism 314' includes an angled bracket 316' having leg 318', arms 320' with apertures 322', and a pair of biasing springs 324'. This arrangement maintains a biasing load on shift fork 186 to ensure movement of range clutch 130 to either of the L and H positions following complete rotation of sector plate 300 by gearmotor 410 to its corresponding position. This arrangement is also adapted to avoid overloading of gearmotor 410 if a blockage condition momentarily inhibits full engagement of range clutch 130 with the clutch teeth on sun gear 136 and aft carrier ring 158. While electrically-controlled shift mechanism 132' is disclosed as utilizing one actuator to move both shift forks, it is to be understood that transfer case 36 could be equipped with a pair of actuators for individually controlling movement of each shift fork.

Figure 15:
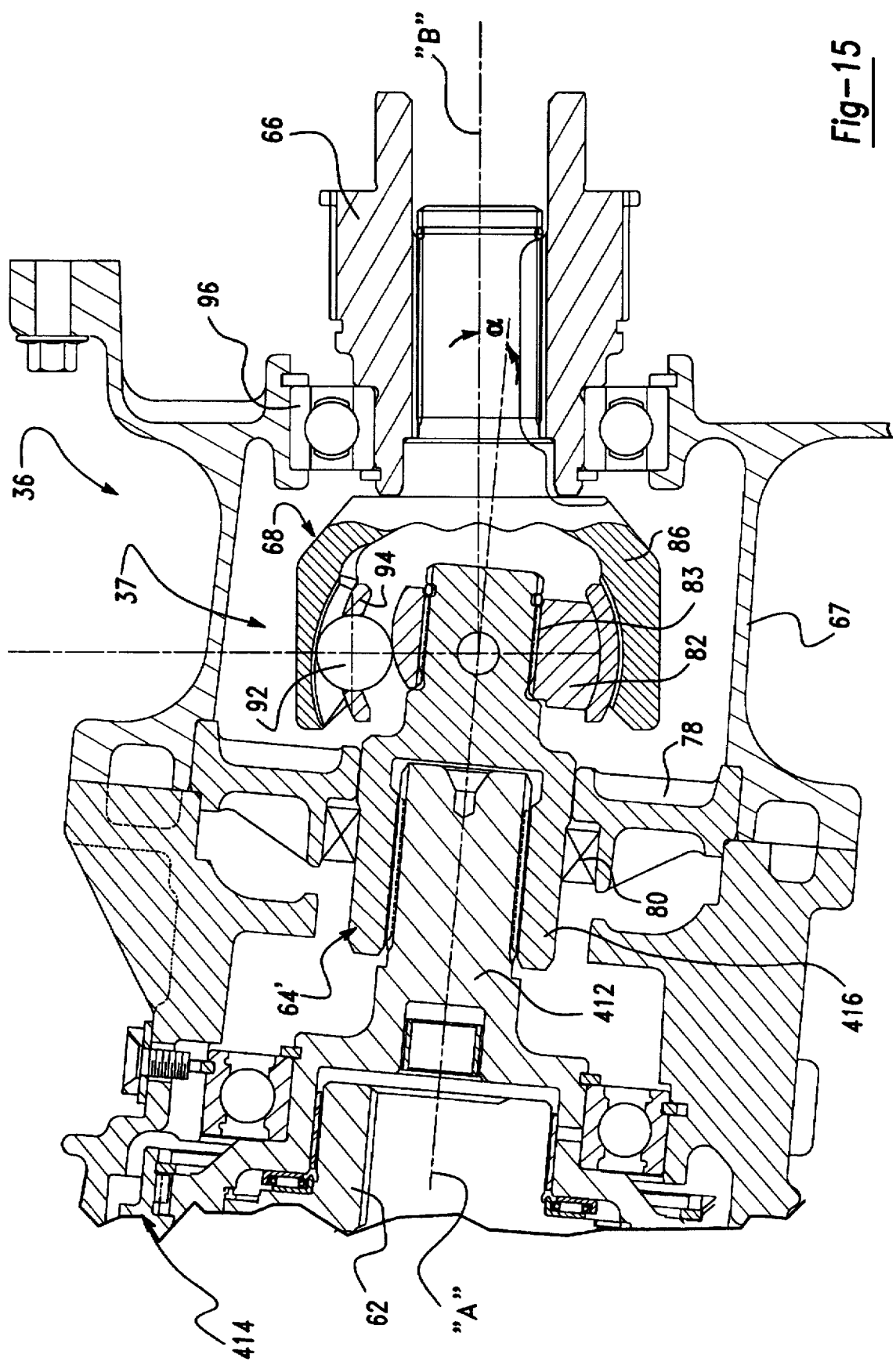
FIG. 15 is a sectional view of an alternative construction for the input section of the transfer case.

The particular input components associated with input 37 of transfer case 36 will be dictated by the specific output components of transmission 14. Thus, while the embodiment disclosed teaches of using an input shaft 64 for coupling transmission output shaft 62 to one rotary component of CV joint 68, various other arrangements are contemplated. For instance, transmission output shaft 62 may be coupled directly to inner race 82 of CV joint 68. A specific alternative example is shown in FIG. 15 wherein an externally-splined output shaft 412 for an add-on overdrive unit 414 is coupled to an internally-splined drum portion 416 of an input shaft 64'. Add-on overdrive unit 414 is operable for providing an additional forward speed ratio for an existing multi-speed automatic transmission by causing its output shaft 412 to be driven at an overdrive speed ratio relative to transmission output shaft 62. Reference can be made to commonly-owned U.S. Pat. No. 4,798,103 to Eastman et al. for details of such an add-on overdrive unit.

As a further alternative for transfer case 36, it is contemplated that mode clutch 195 may be eliminated with drum housing 194 directly connecting drive hub 142 to rear output shaft 40. With such an arrangement, a mode signal indicating selection of the Part-Time Four-Wheel low-Range drive mode would cause controller unit 60 to send a continuous maximum control signal to solenoid assembly 342 for locking-up transfer clutch 52. On-Demand operation would be identical to that previously disclosed with the control signal sent by controller unit 60 to solenoid assembly 342 controllably modulated as a function of the various sensor inputs for automatically controlling the torque transmitted across transfer clutch 52. Obviously, movement of range clutch 130 would still be controlled by shift mechanism 132 or 132'. Such an arrangement still permits the transfer case to provide additional drive modes including a Two-Wheel high-range drive mode, a Part-Time Four-Wheel high-range drive mode, and an On-Demand low-range drive mode.

The foregoing discussion discloses and describes preferred embodiments of the present invention as contemplated by the inventors to set forth the best mode of carrying out the inventive concepts. One skilled in the art will readily recognize from such discussions, and from the accompanying drawings and claims, that various changes, modifications and variations can be made therein without departing from the true spirit and scope of the invention as defined by the following claims.

What is claimed is:

1. A power transfer system for a four-wheel drive vehicle comprising:

a drivetrain;

a primary driveline including a primary prop shaft and primary wheels;

a secondary driveline including a secondary prop shaft and secondary wheels;

a transfer case having a first input member driven by said drivetrain about a first rotary axis, a second input member supported for rotation about a second rotary axis that is angled relative to said first rotary axis, a constant velocity universal joint interconnecting said second input member for driven rotation with said first input member, a primary output shaft coupled to said second input member for driving said primary driveline, a secondary output shaft adapted to drive said secondary driveline, and a transfer clutch capable of transmitting drive torque to said secondary output shafts;

means for sensing the rotational speed of said primary driveline;

means for sensing the rotational speed of said secondary driveline; and controller means for comparing the speed of said primary driveline with the speed of said secondary driveline and controlling the torque transmitted through said transfer clutch in accordance with the magnitude of a speed difference between said primary and secondary drivelines.

2. The power transfer system of claim 1 wherein said primary driveline is a rear driveline of the vehicle and said secondary driveline is a front driveline of the vehicle.

3. The power transfer system of claim 1 wherein said primary and secondary output shafts of said transfer case are supported for rotation about a third axis that is offset from said second rotary axis.

4. The power transfer system of claim 1 further comprising a mode selector for permitting selection of one of an On-Demand drive mode and a Part-Time four-wheel drive mode, and a mode sensor for sensing the particular mode selected and generating a mode signal indicative thereof, said mode signal supplied to said controller means such that when said Part-Time four-wheel drive mode is selected said transfer clutch is placed in a fully actuated state for locking said secondary output shaft to said primary output shaft, and when said On-Demand drive mode is selected said transfer clutch is variably controlled between a non-actuated state and said fully actuated state in accordance with the magnitude of said speed difference.

5. The power transfer system of claim 4 wherein said mode selector further permits selection of a Two-Wheel drive mode and said mode sensor is capable of generating a mode signal indicative thereof, whereby said mode signal is supplied to said controller means for placing and maintaining said transfer clutch in said non-actuated state such that drive torque is transferred only to said primary output shaft.

6. The power transfer system of claim 1 wherein said controller means is operable for engaging said transfer clutch when said speed difference is greater than a predetermined value and disengaging said transfer clutch when said speed difference is less than said predetermined value.

7. The power transfer system of claim 1 wherein said controller means varies the magnitude of drive torque transmitted by said transfer clutch in response to changes in said speed differential having a value greater than said predetermined value.

8. The power transfer system of claim 1 wherein said transfer case further comprises a torque transfer mechanism driven by said second input member, and wherein said transfer clutch has a first clutch member coupling said primary output shaft to said torque transfer mechanism for normally transferring drive torque to said primary driveline, first clutch plates fixed for rotation with said first clutch member, a second clutch member fixed for rotation with said secondary output shaft, second clutch plates fixed for rotation with said second clutch member and interleaved with said first clutch plates, and an actuator for applying a clutch engagement force on said interleaved clutch plates to transmit drive torque to said secondary output shaft for establishing an On-Demand four-wheel drive mode, said actuator being controlled by said controller means for varying said clutch engagement force in relation to variations in said speed difference.

9. The power transfer system of claim 8 further comprising a mode clutch that is operable in a first position for coupling said secondary output shaft to said primary output shaft for establishing a Part-Time four-wheel drive mode, and in a second position for de-coupling said secondary output shaft from said primary output shaft to permit operation in said On-Demand four-wheel drive mode, and a shift mechanism for moving said mode clutch between said first and second positions.

10. The power transfer system of claim 9 further comprising a mode selector that can be selectively actuated for causing movement of said shift mechanism so as to establish said On-Demand drive mode and said Part-Time four-wheel drive mode, and a mode sensor for sensing the particular mode selected and generating a mode signal indicative thereof, said mode signal supplied to said controller means such that when said Part-Time four-wheel drive mode is selected said transfer clutch is placed and maintained in a non-actuated state, and when said On-Demand drive mode is selected said transfer clutch is variably controlled between said non-actuated state and a fully-actuated in accordance with variations in the magnitude of said speed difference.

11. The power transfer system of claim 10 wherein during operation in said On-Demand drive mode said transfer clutch is placed in said non-actuated state when the value of said speed difference is less than a predetermined minimum value and is placed in said fully-actuated state when the value of said speed signal is greater than a predetermined maximum value, and wherein the actuated state of said transfer clutch is varied between said non-actuated and fully-actuated states in response to changes in the magnitude of said speed difference between said predetermined minimum and maximum values.

12. The power transfer system of claim 10 wherein said mode selector is further operable to permit selection of a Two-Wheel drive mode whereat said mode clutch is located in said second position, and said mode sensor is capable of generating a mode signal indicative of selection of said Two-Wheel drive mode which causes said controller means to place and maintain said transfer clutch in said non-actuated state.

13. The power transfer system of claim 9 further comprising a speed reduction apparatus for establishing a high-range speed ratio connection and a reduced low-range speed ratio connection between said second input member and said torque transfer mechanism, and a range clutch that is movable between a high-range position for establishing said high-range connection and a low-range position for establishing said low-range connection, said shift mechanism operable for moving said range clutch between said high-range and low-range positions.

14. The power transfer system of claim 13 further comprising a mode selector for causing said shift mechanism to move said mode clutch and said range clutch so as to establish an On-Demand high-range drive mode whereat said range clutch is in said high-range position and said mode clutch is in said second position, and a Pad-Time four-wheel low-range drive mode whereat said range clutch is in said low-range position and said mode clutch is in said first position, and a mode sensor for sensing the particular drive mode selected and generating a mode signal indicative thereof that is supplied to said controller means, whereby selection of said On-Demand high-range drive mode causes said controller means to variably control the actuated condition of said transfer clutch between a non-actuated state and a fully actuated state in accordance with the magnitude of said speed difference, and selection of said Part-Time four-wheel low-range drive mode causes said controller means to place and maintain said transfer clutch in said non-actuated state.

15. The power transfer system of claim 14 wherein said mode selector is further operable to permit selection of a Pad-Time four-wheel high-range drive mode whereat said range clutch is in said high-range position and said mode clutch is in said first position, and wherein said mode signal generated in response to selection of said Part-Time four-wheel high-range drive mode causes said controller means to place and maintain said transfer clutch in said non-actuated state.

16. The power transfer system of claim 14 wherein said mode selector is further operable to permit selection of a Two-Wheel high-range drive mode whereat said range clutch is in said high-range position and said mode clutch is in said second position, and wherein said mode signal generated in response to selection of said Two-Wheel high-range drive mode causes said controller means to place and maintain said transfer clutch in said non-actuated state.

17. The power transfer system of claim 14 wherein during operation in said On-Demand drive mode said transfer clutch is placed in said non-actuated state when the value of said speed difference is less than a predetermined minimum value and is placed in said fully-actuated state when the value of said speed signal is greater than a predetermined maximum value, and wherein the actuated state of said transfer clutch is varied between said non-actuated and fully-actuated states in response to changes in the magnitude of said speed difference between said predetermined minimum and maximum values.

18. The power transfer system of claim 14 wherein said range clutch is movable to a neutral position for disconnecting said torque transfer mechanism from driven connection with said second input member to establish a Neutral mode, and wherein said mode selector is operable for permitting selection of said Neutral mode whereat said range clutch is in said neutral position, said mode clutch is in said second position and said transfer clutch is placed and maintained in said non-actuated state.

19. A power transfer system for a four-wheel drive vehicle comprising:
a drivetrain;
a primary driveline including a primary prop shaft and primary wheels;
a secondary driveline including a secondary prop shaft and secondary wheels;
a transfer case having a first input member driven by said drivetrain about a first rotary axis, a second input member supported for rotation about a second rotary axis that is angled relative to said first rotary axis, a constant velocity joint interconnecting said second input member for driven rotation with said first input member, a primary output shaft adapted to drive said primary driveline, a secondary output shaft adapted to drive said secondary driveline, and a transfer clutch capable of transmitting drive torque to said secondary output shafts;
means for sensing the rotational speed of said primary driveline;
means for sensing the rotational speed of said secondary driveline;
controller means for comparing the speed of said primary driveline with the speed of said secondary driveline and controlling the torque transmitted through said transfer clutch in accordance with the magnitude of a speed difference between said primary and secondary drivelines;
a mode selector for permitting selection of one of an On-Demand drive mode and a Part-Time four-wheel drive mode; and
a mode sensor for sensing the particular mode selected and generating a mode signal indicative thereof, said mode signal supplied to said controller means such that when said Part-Time four-wheel drive mode is selected said transfer clutch is placed in a fully actuated state for effectively locking said secondary output shaft to said primary output shaft, and when said On-Demand drive mode is selected said transfer clutch is variably controlled between a non-actuated state and said fully actuated state in accordance with the magnitude of said speed difference.

20. The power transfer system of claim 19 wherein said primary driveline is a rear driveline of the vehicle and said secondary driveline is a front driveline of the vehicle.

21. The power transfer system of claim 19 wherein said primary and secondary output shafts of said transfer case are supported for rotation about a third axis that is offset from said second rotary axis.

22. The power transfer system of claim 19 further comprising a torque transfer mechanism driven by said second input member, said transfer clutch having a first clutch member coupling said primary output shaft to said torque transfer mechanism for normally transferring drive torque to said primary driveline for establishing a Two-Wheel drive mode, first clutch plates fixed for rotation with said first clutch member, a second clutch member fixed for rotation with said secondary output shaft, second clutch plates fixed for rotation with said second clutch member and interleaved with said first clutch plates, and an actuator for applying a clutch engagement force on said interleaved clutch plates for transferring drive torque to said secondary output shaft for establishing said On-Demand drive mode, said actuator being controlled by said controller means for varying said clutch engagement force in relation to variations in said speed difference.

23. The power transfer system of claim 19 wherein said mode selector further permits selection of a Two-Wheel drive mode and said mode sensor is capable of generating a mode signal indicative thereof, whereby said mode signal is supplied to said controller means for placing and maintaining said transfer clutch in said non-actuated state such that drive torque is transferred only to said primary output shaft.

24. The power transfer system for a four-wheel drive vehicle comprising:
a drivetrain;
a primary driveline including a primary prop shaft and primary wheels;
a secondary driveline including a secondary prop shaft and secondary wheels;
a transfer case having a first input member driven by said drivetrain about a first rotary axis, a second input member supported for rotation about a second rotary axis that is angled relative to said first rotary axis, a constant velocity universal joint interconnecting said second input member for driven rotation with said first input member, a primary output shaft coupled to said second input member for driving said primary driveline, a secondary output shaft adapted to drive said secondary driveline, and a transfer clutch capable of transmitting drive torque to said secondary output shaft;
means for sensing the rotational speed of said primary driveline;
means for sensing the rotational speed of said secondary driveline;
controller means for comparing the speed of said primary driveline with the speed of said secondary driveline and controlling the torque transmitted through said transfer clutch in accordance with the magnitude of a speed difference between said primary and secondary drivelines;
a mode clutch that is operable in a first position for coupling said secondary output shaft to said primary output shaft, and in a second position for uncoupling said secondary output shaft from said primary output shaft;
a shift mechanism for moving said mode clutch between said first and second positions;

a mode selector for permitting selection of an On-Demand drive mode and a Part-Time four-wheel drive mode, said mode selector operable for controlling movement of said shift mechanism; and a mode sensor for sensing the particular mode selected and generating a mode signal indicative thereof, said mode signal supplied to said controller means such that when said Part-Time four-wheel drive mode is selected said transfer clutch is placed and maintained in a non-actuated state and said mode clutch is moved to said first position, and wherein when said On-Demand drive mode is selected said mode clutch is shifted to said second position and said transfer clutch is variably controlled between said non-actuated state and a fully-actuated state in accordance with variations of the magnitude of said speed difference.

25. The power transfer system of claim 24 wherein said mode selector is further operable to permit selection of a Two-Wheel drive mode whereat said mode clutch is located in said second position and said mode sensor generates a mode signal for causing said controller means to place and maintain said transfer clutch in said non-actuated state.

* * * * *

UNITED STATES PATENT AND TRADEMARK OFFICE
CERTIFICATE OF CORRECTION

PATENT NO. : 5,695,022
DATED : DECEMBER 9, 1997
INVENTOR(S) : JOHN D. ZALEWSKI, JAMES S. BRISSENDEN

It is certified that error appears in the above-indentified patent and that said Letters Patent is hereby corrected as shown below:

Column 3, line 4, before "i.e.," insert --(--.

Column 7, line 63, "dutch" should be --clutch--.

Column 9, line 36, after "a" should be --an--.

Column 10, line 66, "popper" should be --poppet--.

Column 11, line 39, "Circuit" should be --circuit--.

Column 13, line 6, after "plurality" insert --of--.

Column 14, line 47, delete "," (second occurrence in patent).

Column 15, line 10, "a" should be --an--.

UNITED STATES PATENT AND TRADEMARK OFFICE
CERTIFICATE OF CORRECTION

PATENT NO. : 5,695,022
DATED : DECEMBER 9, 1997
INVENTOR(S) : JOHN D. ZALEWSKI, JAMES S. BRISSENDEN

It is certified that error appears in the above-indentified patent and that said Letters Patent is hereby corrected as shown below:

Column 16, line 12, "low-Range" should be --low-range--.

Column 18, line 5, claim 10, after "fully-actuated" insert --state--.

Column 18, line 41, claim 14, "Pad-Time" should be --Part-Time--.

Column 18, line 57, claim 15, "Pad-Time" should be --Part-Time--.

Signed and Sealed this

Sixteenth Day of June, 1998

Attest:

BRUCE LEHMAN

Attesting Officer

Commissioner of Patents and Trademarks